(12) United States Patent
Nakamura et al.

(10) Patent No.: US 12,312,168 B2
(45) Date of Patent: May 27, 2025

(54) TRANSFER DEVICE

(71) Applicant: Daifuku Co., Ltd., Osaka (JP)

(72) Inventors: Hiroaki Nakamura, Hinocho (JP); Masashige Iwata, Hinocho (JP); Kazunari Kimura, Hinocho (JP)

(73) Assignee: Daifuku Co., Ltd., Osaka (JP)

( * ) Notice: Subject to any disclaimer, the term of this patent is extended or adjusted under 35 U.S.C. 154(b) by 329 days.

(21) Appl. No.: 17/982,925

(22) Filed: Nov. 8, 2022

(65) Prior Publication Data

US 2023/0150774 A1    May 18, 2023

(30) Foreign Application Priority Data

Nov. 9, 2021    (JP) ................................. 2021-182466

(51) Int. Cl.
*B65G 1/04*    (2006.01)
(52) U.S. Cl.
CPC ................................. *B65G 1/0435* (2013.01)
(58) Field of Classification Search
CPC .................................................. B65G 1/0435
USPC ...................................................... 414/280
See application file for complete search history.

(56) References Cited

U.S. PATENT DOCUMENTS

| | | | | |
|---|---|---|---|---|
| 5,839,872 A * | 11/1998 | Goto | .................... | B65G 1/0435 414/280 |
| 6,923,612 B2 * | 8/2005 | Hansl | .................. | B65G 1/0435 414/280 |
| 8,790,061 B2 * | 7/2014 | Yamashita | ........... | B65G 1/0435 414/280 |
| 9,150,355 B2 * | 10/2015 | Hortig | .................. | B65G 1/0407 |
| 2012/0099953 A1 | 4/2012 | Hortig et al. | | |
| 2020/0216268 A1 * | 7/2020 | Shen | .................... | B65G 1/0492 |
| 2022/0204271 A1 | 6/2022 | Iwata et al. | | |
| 2022/0324647 A1 | 10/2022 | He | | |

FOREIGN PATENT DOCUMENTS

| | | |
|---|---|---|
| CN | 110357006 A | 10/2019 |
| EP | 2530034 A1 | 12/2012 |
| JP | 2000118625 A | 4/2000 |
| JP | 2012184085 A | 9/2012 |
| JP | 2020189711 A | 11/2020 |
| WO | 2021047167 A1 | 3/2021 |

\* cited by examiner

*Primary Examiner* — James Keenan
(74) *Attorney, Agent, or Firm* — The Webb Law Firm

(57) ABSTRACT

A transfer device includes a first hook and a second hook. The first hook has a first side-edge section, which is an end edge on a second side in the width direction in a first retreat position. A partial region of the first side-edge section that includes at least a first leading-end section has a shape that is curved or bent to gradually extend toward the first side in the width direction while extending toward the first leading-end section. The second hook has a second side-edge section, which is an end edge on the first side in the width direction in a second retreat position. A partial region of the second side-edge section that includes at least a second leading-end section has a shape that is curved or bent to gradually extend toward the second side in the width direction while extending toward the second leading-end section.

7 Claims, 11 Drawing Sheets

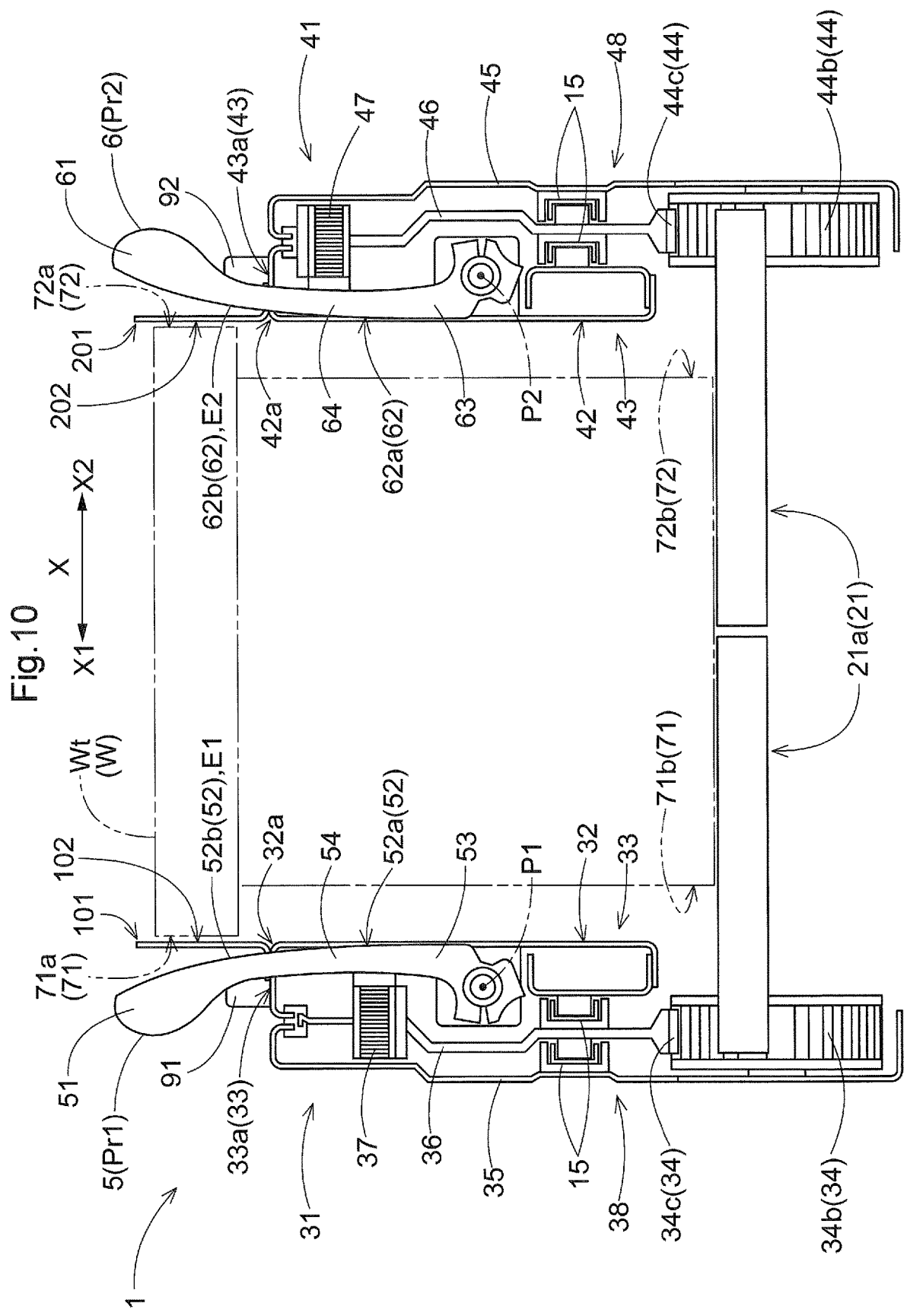

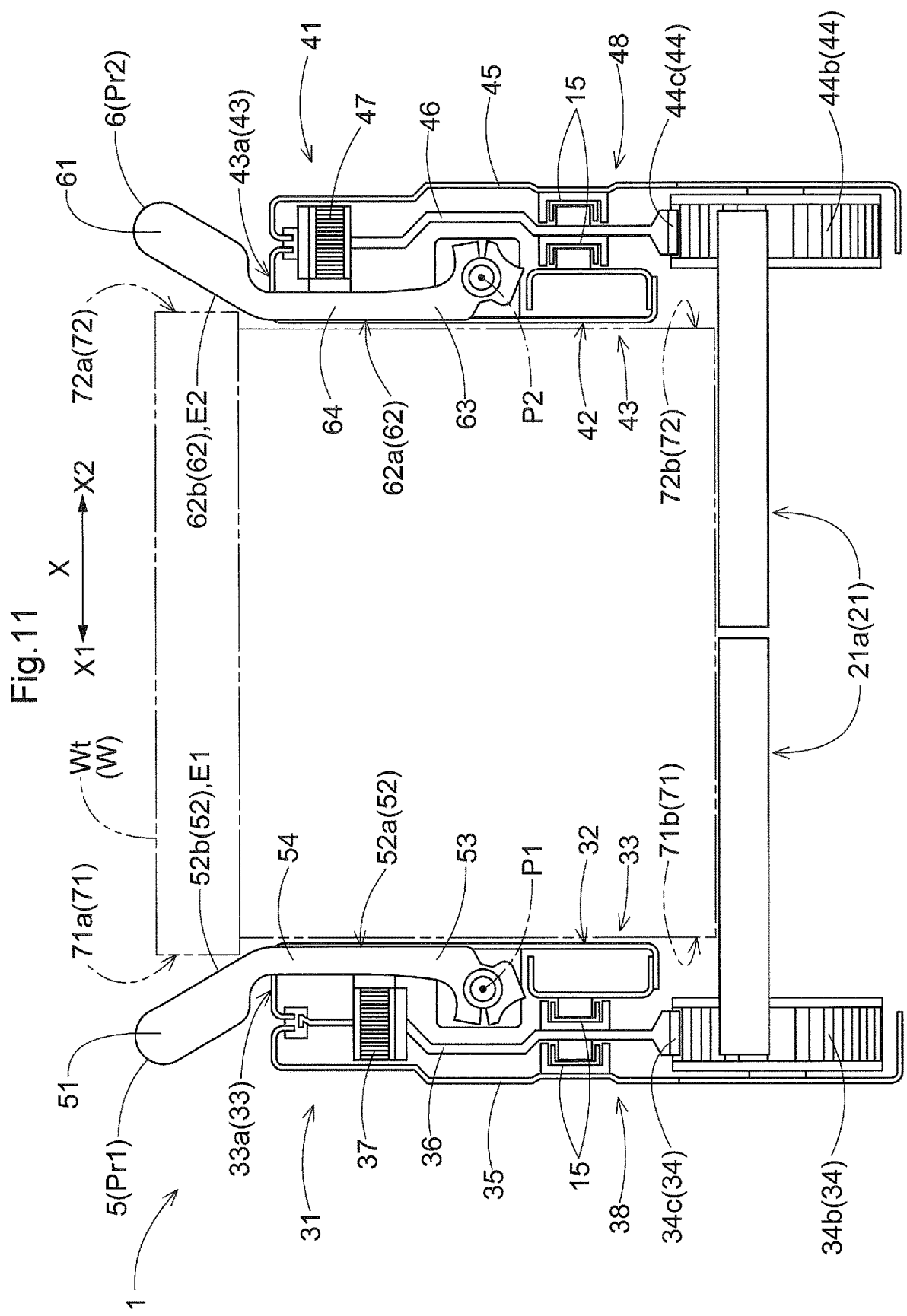

TRANSFER DEVICE

CROSS-REFERENCE TO RELATED APPLICATION

This application claims priority to Japanese Patent Application No. 2021-182466 filed Nov. 9, 2021, the disclosure of which is hereby incorporated by reference in its entirety.

BACKGROUND OF THE INVENTION

1. Field of the Invention

The present invention relates to a transfer device configured to perform a transfer operation to move an article in a transfer direction between a supporter configured to support the article and a transfer target location.

2. Description of the Related Art

JP 2012-184085A (Patent Document 1) discloses an example of this type of transfer device. In the following, reference signs and names in parentheses in the description of related art are those of Patent Document 1.

The transfer device of Patent Document 1 includes a pair of advance-retreat sections (a pair of advance-retreat members 2) that moves back and forth in a transfer direction (front-back direction Y) and hooks (3) attached to respective ends of each advance-retreat section in the transfer direction. Each hook (3) is rotatable about an axis parallel with the transfer direction, and is caught on a face of an article (package W) that faces in the transfer direction while the hook (3) is in a protruding position in which the hook (3) protrudes in the width direction (left-right direction X) orthogonal to the transfer direction. This transfer device (1) transfers the article to and from a package storage rack (7) by moving the pair of advance-retreat sections (2) back and forth in the transfer direction with the hooks (3) thus caught on the article to be transferred.

The hooks (3) of the transfer device of Patent Document 1 each have a linear bar shape. For this reason, the hooks (3) may interfere with an article when the hooks (3) are in a retreat position in which the hooks (3) are parallel with the up-down direction, depending on the shape and/or the size of the article to be transferred. For example, if the article has a tapered shape that expands outward in the width direction while extending upward, a leading-end region of a hook (3) in the retreat position may come into contact with an upper part of the article. In this case, the transfer device (1) may not be able to appropriately transfer this article between the device and the transfer target location.

SUMMARY OF THE INVENTION

Therefore, in view of the foregoing, there is a demand for the realization of a transfer device capable of appropriately transferring an article without a hook interfering with the article.

A transfer device according to the present disclosure is a transfer device configured to perform a transfer operation to move an article in a transfer direction between a supporter configured to support the article and a transfer target location, the transfer device including: a first advance-retreat section configured to move back and forth in the transfer direction relative to the supporter; a second advance-retreat section located on a second side in a width direction, which is orthogonal to the transfer direction as viewed in an up-down direction, relative to the first advance-retreat section and configured to move back and forth in the transfer direction relative to the supporter, the second side in the width direction being one side in the width direction; a first hook supported by the first advance-retreat section and configured to change in position between a first retreat position and a first protruding position by pivoting about a first axis parallel with the transfer direction; and a second hook supported by the second advance-retreat section and configured to change in position between a second retreat position and a second protruding position by pivoting about a second axis parallel with the transfer direction, wherein the first retreat position is a position in which the first hook is parallel with the up-down direction, a leading-end section, which is a leading-end section of the first hook, is above the first axis, and the first hook does not overlap the article as viewed in the transfer direction, the first protruding position is a position in which the first leading-end section is on the second side in the width direction relative to a position of the first leading-end section in the first retreat position, and the first hook overlaps the article as viewed in the transfer direction, the second retreat position is a position in which the second hook is parallel with the up-down direction, a second leading-end section, which is a leading-end section of the second hook, is above the second axis, and the second hook does not overlap the article as viewed in the transfer direction, the second protruding position is a position in which the second leading-end section is on a first side in the width direction relative to a position of the second leading-end section in the second retreat position, and the second hook overlaps the article as viewed in the transfer direction, the first side in the width direction being another side in the width direction, the first hook has a first side-edge section that is an end edge on the second side in the width direction in the first retreat position, and the first side-edge section includes a partial region including at least the first leading-end section and having a shape that is, in the first retreat position, curved or bent to gradually extend toward the first side in the width direction while extending toward the first leading-end section, and the second hook has a second side-edge section that is an end edge on the first side in the width direction in the second retreat position, and the second side-edge section includes a partial region including at least the second leading-end section and having a shape that is, in the second retreat position, curved or bent to gradually extend toward the second side in the width direction while extending toward the second leading-end section.

Some articles transferred by the transfer device have an upper section whose dimension in the width direction is larger than the dimension of a lower section in the width direction. According to this configuration, it is easy to avoid interference between this type of article and leading-end-side regions of the first and second hooks in the retreat position.

Further, the first and second hooks in the retreat position need not be unnecessarily pivoted outward in the width direction to avoid such interference. Accordingly, it is possible to keep low the amount that each of the first the second hooks pivots for a position change between the retreat position and the protruding position. This makes it easy to shorten the time required to change the positions of the first and second hooks.

Further features and advantages of the transfer device will become apparent from the following description of exemplary and non-limiting embodiments that will be described with reference to the drawings.

BRIEF DESCRIPTION OF THE DRAWINGS

FIG. 10 shows the transfer direction according to the second embodiment as viewed in the transfer direction.

FIG. 11 shows the shape of hooks according to another embodiment as viewed in the transfer direction.

DESCRIPTION OF THE INVENTION

A transfer device is a device that performs an article transfer operation. Hereinafter, embodiments of the transfer device will be described by taking as an example the case where an article transport facility in which articles are transported and stored is equipped with article transport vehicles 10 each of which includes the transport device.

First Embodiment

First, the first embodiment of a transfer device 1 will be described.

1. Overview of Article Transport Facility

Figure 1:
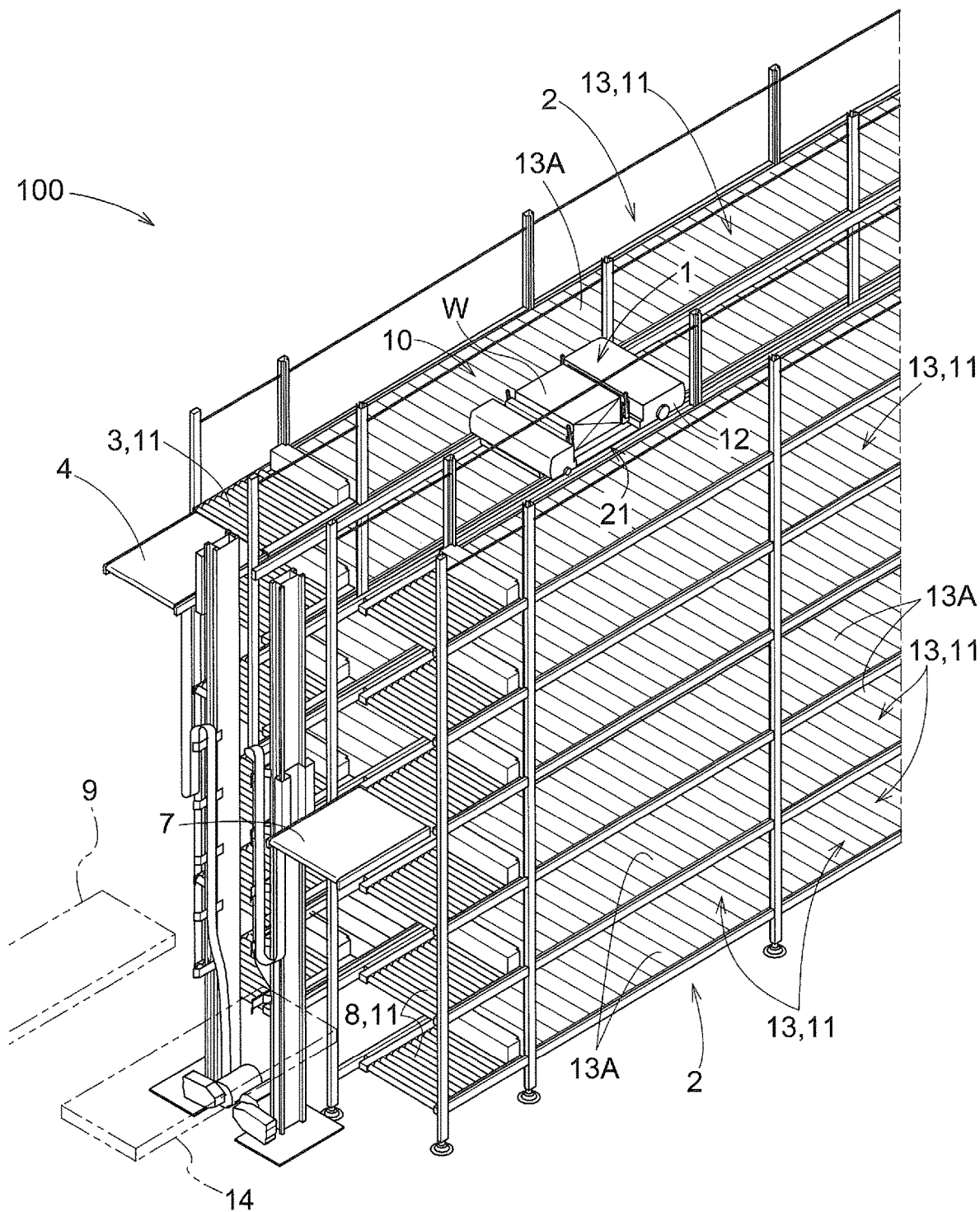
FIG. 1 is a perspective view of an article transport facility.

An article transport facility 100 is equipped with an article transport vehicle 10 that includes the transfer device 1, and an article storage rack 2 that includes a plurality of storage sections 13, as shown in FIG. 1.

The article transport vehicle 10 transfers an article W in a specific direction in a horizontal plane. The article transport vehicle 10 in the present embodiment transfers the article W along a front face of the article storage rack 2. The article storage rack 2 in the present embodiment has a multi-level structure with multi-level shelves 13A in the up-down direction. The article transport vehicle 10 is disposed at each level of the article storage rack 2. Note that FIG. 1 only shows an article transport vehicle 10 provided at the uppermost level of the article storage rack 2, out of a plurality of article transport vehicles 10.

The article storage rack 2 includes a plurality of storage sections 13 disposed parallel with the up-down direction and a direction in which the travel path of the article transport vehicle 10 extends. Each storage section 13 is for storing an article W transported from the article transport vehicle 10. The article storage rack 2 in the present embodiment has a plurality of shelves 13A in the up-down direction that are disposed parallel with the rack-depth direction and the direction in which the travel path of the article transport vehicle 10 extends. The shelves 13A constitute the storage sections 13. An article W is put into a storage section 13 by being placed on a shelf 13A. In the present embodiment, a pair of such article storage racks 2 is provided. The two article storage racks 2 face each other in the rack-depth direction with the travel path of the article transport vehicle 10 therebetween. Note that the rack-depth direction in the present embodiment is a direction orthogonal to the direction in which the travel path of the article transport vehicle 10 extends as viewed in the vertical direction.

The article transport facility 100 in the present embodiment is equipped with various devices for loading articles W onto the article storage rack 2. Specifically, the article transport facility 100 is equipped with a loading conveyor 9, a loading lift 4, and loading relay conveyors 3. The loading conveyor 9 transports an article W to be loaded onto the article storage rack 2 from the outside. The loading lift 4 receives the article W from the loading conveyor 9, raises and lowers the article W, and delivers the article W to a loading relay conveyor 3. Each loading relay conveyor 3 receives the article W from the loading lift 4 and delivers the article W to the article transport vehicle 10. The loading relay conveyors 3 in this example are provided at respective levels of the article storage rack 2. The loading lift 4 can deliver the article W to the loading relay conveyor 3 at each level by raising or lowering the article W.

The article transport facility 100 in the present embodiment is equipped with various devices for unloading articles W from the article storage rack 2. Specifically, the article transport facility 100 is equipped with an unloading conveyor 14, an unloading lift 7, and unloading relay conveyors 8. Each unloading relay conveyor 8 receives an article W from the article transport vehicle 10 and delivers the article W to the unloading lift 7. The unloading relay conveyors 8 in this example are provided at the respective levels of the article storage rack 2. The unloading lift 7 can move up and down. The unloading lift 7 can receive the article W from the unloading relay conveyor 8 at each level by moving up or down, and delivers the article W to the unloading conveyor 14. The unloading conveyor 14 receives the article W from the unloading lift 7 and transports this article W to the outside.

2. Overview of Article Transport Vehicle

Figure 2:
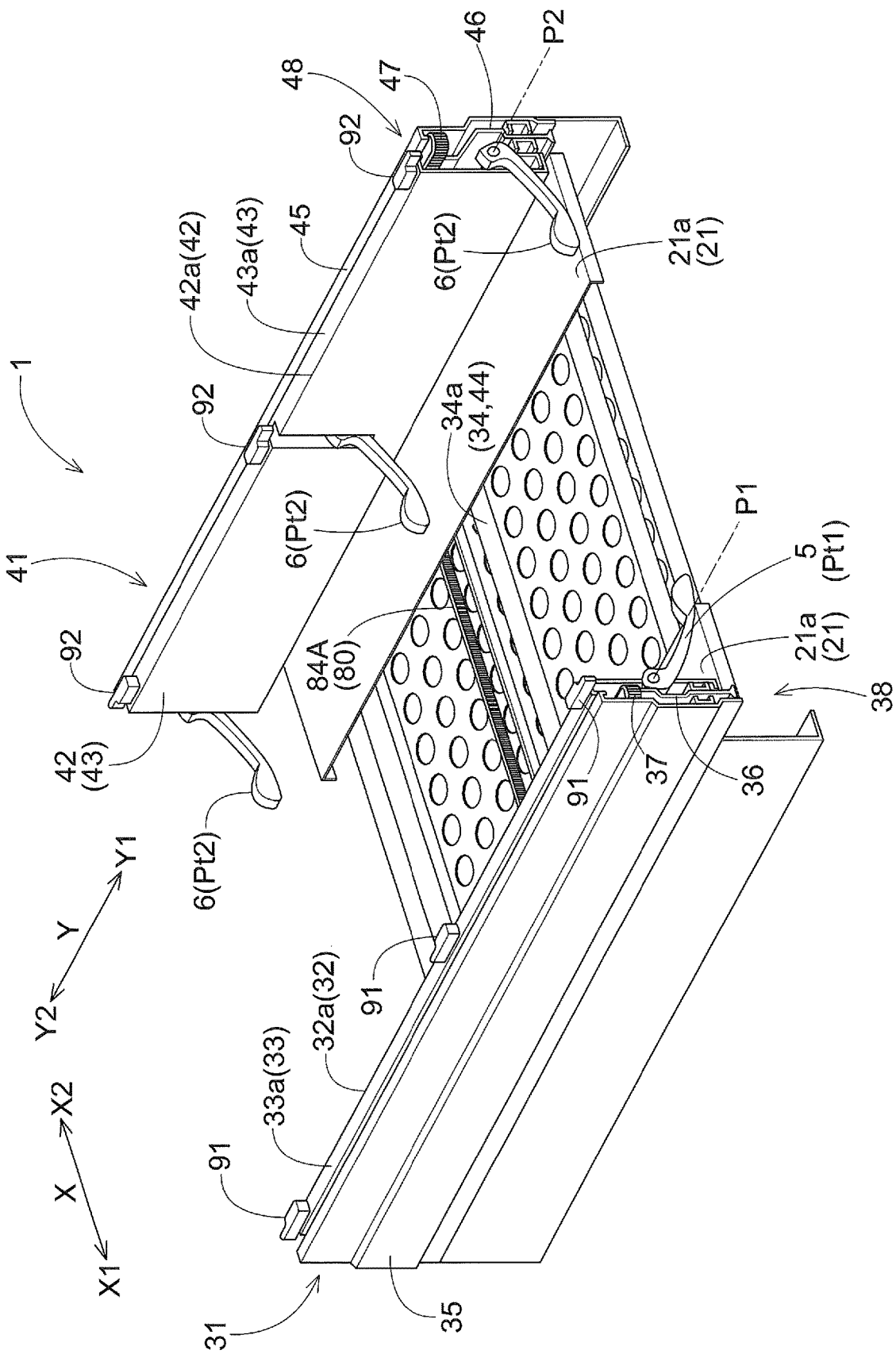
FIG. 2 is a perspective view of a transfer device with advance-retreat sections in a withdrawn state.
Figure 3:
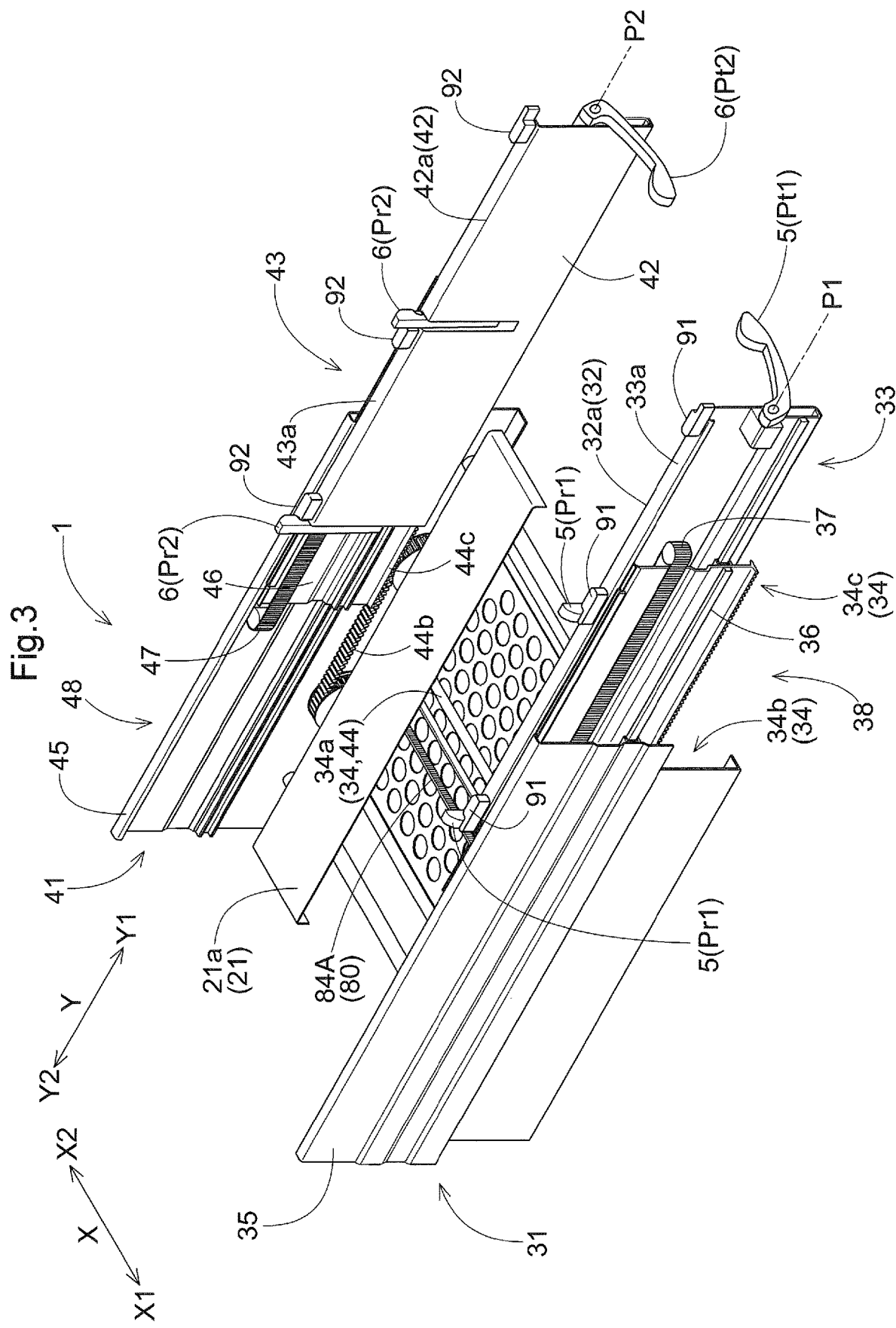
FIG. 3 is a perspective view of the transfer device with the advance-retreat sections in a protruding state.

The article transport vehicle 10 includes a supporter 21 and the transfer device 1, as shown in FIGS. 2 and 3. The transfer device 1 performs a transfer operation, namely an operation to move an article W in the transfer direction Y between the supporter 21 for supporting the article W and a transfer target location 11. The transfer device 1 thus transfers the article W between the supporter 21 and the transfer target location 11. The supporter 21 in the present embodiment is provided in the article transport vehicle 10. Examples of the transfer target location 11 include a storage section 13, a loading relay conveyor 3, and an unloading relay conveyor 8.

In the following, the direction in which the article W moves while the transfer device 1 performs the transfer operation will be referred to as a "transfer direction Y", one side in the transfer direction Y as a "first side Y1 in the transfer direction Y", and the other side in the transfer direction Y as a "second side Y2 in the transfer direction Y". The direction orthogonal to the transfer direction Y as viewed in the up-down direction will be referred to as a "width direction X", one side in the width direction X as a "first side X1 in the width direction X", and the other side in the width direction X as a "second side X2 in the width direction X".

The article transport vehicle 10 in the present embodiment includes a traveling body 12 (see FIG. 1) that travels in the width direction X and a travel motor 12M (see FIG. 8) that drives the traveling body 12. The traveling body 12 is driven by the travel motor 12M and travels in the width direction X. The traveling body 12 in this example supports the supporter 21 and the transfer device 1.

The supporter 21 in the present embodiment includes support plates 21a for supporting an article W from below, as shown in FIGS. 2 and 3. The support plates 21a are provided in correspondence with a first advance-retreat section 31 and a second advance-retreat section 41, which will be described later. The support plates 21a are located inward, in the width direction X, of the first advance-retreat section 31 and the second advance-retreat section 41 (see FIG. 4). In this example, an article W is placed on a pair of support plates 21a separated from each other in the width direction X. The article transport vehicle 10 transports, in the width direction X, the article W supported by the pair of support plates 21a.

3. Transfer Device

The transfer device 1 includes the first advance-retreat section 31, the second advance-retreat section 41, first hooks 5, and second hooks 6, as shown in FIGS. 2 and 3. The transfer device 1 in the present embodiment also includes a spacing change mechanism 80.

3-1. First Advance-Retreat Section

The first advance-retreat section 31 serves to move the first hooks 5 back and forth in the transfer direction Y relative to the supporter 21. The first advance-retreat section 31 also serves to restrict movement of the article W in the width direction X and guide movement of the article W in the transfer direction Y together with the second advance-retreat section 41. The first advance-retreat section 31 moves back and forth in the transfer direction Y relative to the supporter 21, as shown in FIGS. 2 and 3. The first advance-retreat section 31 in the present embodiment moves back and forth in such a manner as to be capable of entering both a state of protruding toward the first side Y1 in the transfer direction Y relative to the supporter 21 and a state of protruding toward the second side Y2 in the transfer direction Y relative to the supporter 21. A specific configuration of the first advance-retreat section 31 will be described below.

The first advance-retreat section 31 in the present embodiment includes a first opposing face 32 that opposes a first side face 71 of the article W that faces the first side X1 in the width direction X, as shown in FIGS. 2, 3, 4, and 5. The first opposing face 32 in this example opposes the first side face 71 of the article W supported by the supporter 21, and also opposes the first side face 71 of the article W moving in the transfer direction Y relative to the supporter 21. Further, the first advance-retreat section 31 has a first body 33, which includes the first opposing face 32 opposing the first side face 71 of the article W that faces the first side X1 in the width direction X, and a first advance-retreat mechanism 38 that moves the first body 33 back and forth. The first body 33 in this example is a member having a plate-like section extending in the transfer direction Y and the up-down direction. The first body 33 has the first opposing face 32 as a face that faces the second side X2 in the width direction X. The first advance-retreat mechanism 38 includes a first fixed section 35, a first relay section 36 provided between the first body 33 and the first fixed section 35, and a first interlocking section 37 that interlocks the first relay section 36 and the first body 33.

The first fixed section 35 in this example is fixed to the traveling body 12. The first relay section 36 is so supported as to be movable in the transfer direction Y relative to the first fixed section 35. The first body 33 is so supported as to be movable in the transfer direction Y relative to the first relay section 36. The first interlocking section 37 moves the first body 33 relative to the first relay section 36 toward the side toward which the first relay section 36 moves in response to the first relay section 36 moving back or forth in the transfer direction Y relative to the first fixed section 35. The first body 33 in the shown example is supported by the first relay section 36 via a linear movement guide mechanism 15. Similarly, the first relay section 36 is supported by the first fixed section 35 via the linear movement guide mechanism 15. That is, the first body 33 and the first relay section 36 are guided by the linear movement guide mechanism 15 and move back and forth in the transfer direction Y.

Figure 4:
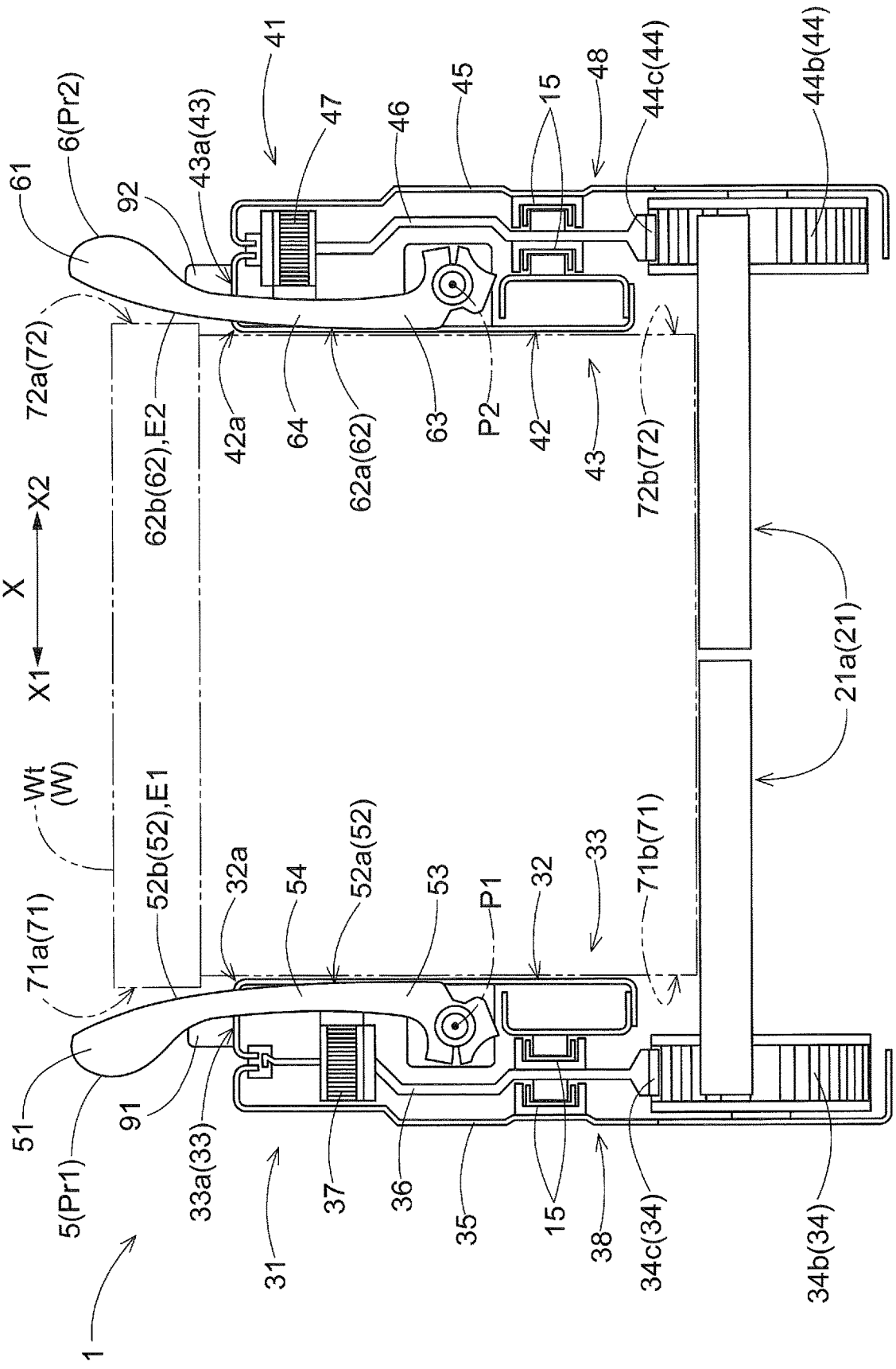
FIG. 4 shows hooks in a retreat position as viewed in a transfer direction.
Figure 5:
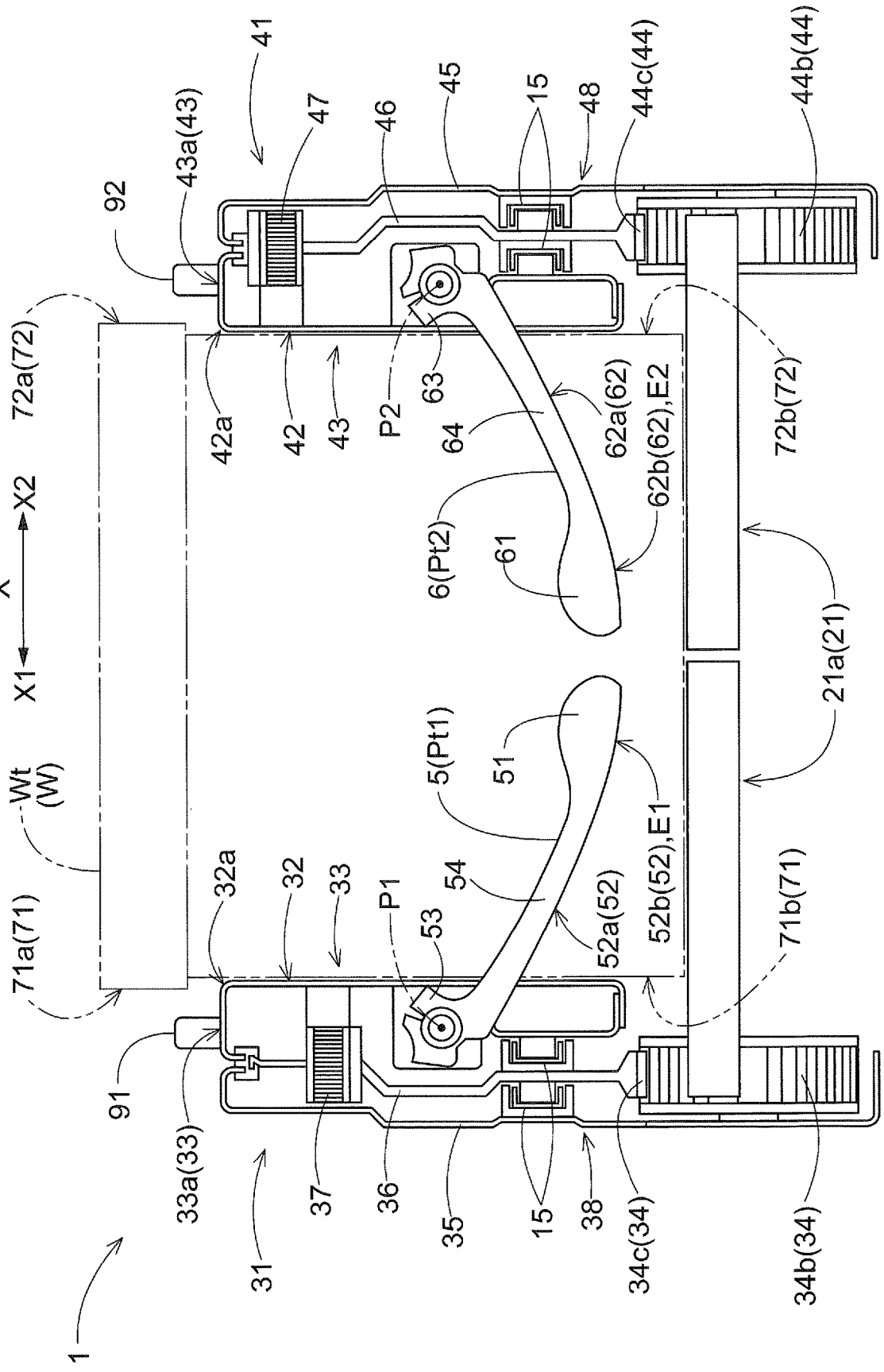
FIG. 5 shows the hooks in a protruding position as viewed in the transfer direction.

The first advance-retreat section 31 in this example also includes a first driving mechanism 34, as shown in FIGS. 3, 4, and 5. The first driving mechanism 34 includes a drive shaft 34a, an advance-retreat motor 34M (see FIG. 8) that drives the drive shaft 34a to rotate, a first belt 34b disposed parallel with the transfer direction Y and turned by the rotation of the drive shaft 34a, and a first rack 34c that is provided in the first relay section 36 and meshes with the first belt 34b (see FIGS. 4 and 5). The first driving mechanism 34 drives the drive shaft 34a to rotate with use of the advance-retreat motor 34M, and turns the first belt 34b in a longitudinal direction thereof (transfer direction Y). The first driving mechanism 34 can thus move the first body 33 and the first relay section 36 toward the same side in the transfer direction Y.

3-2. Second Advance-Retreat Section

The second advance-retreat section 41 is located on the second side X2 in the width direction X relative to the first advance-retreat section 31, as shown in FIGS. 2 and 3. The second advance-retreat section 41 in the present embodiment is separated from the first advance-retreat section 31 in the width direction X. An article W is disposed between the first advance-retreat section 31 and the second advance-retreat section 41 while being supported by the supporter 21. The second advance-retreat section 41 serves to move the second hooks 6 back and forth in the transfer direction Y relative to the supporter 21. The second advance-retreat section 41 moves back and forth in the transfer direction Y relative to the supporter 21. The second advance-retreat section 41 in the present embodiment moves back and forth in such a manner as to be capable of entering both a state of protruding toward the first side Y1 in the transfer direction Y relative to the supporter 21 and a state of protruding toward the second side Y2 in the transfer direction Y relative to the supporter 21. Also, the second advance-retreat section 41 moves back and forth in the transfer direction Y in synchronization with the first advance-retreat section 31. A specific configuration of the second advance-retreat section 41 will be described below. Note that the second advance-retreat section 41 in the present embodiment has the same configuration as the first advance-retreat section 31.

The second advance-retreat section 41 in the present embodiment includes a second opposing face 42 that opposes a second side face 72 of the article W that faces the second side X2 in the width direction X, as shown in FIGS. 2, 3, 4, and 5. The second opposing face 42 in this example opposes the second side face 72 of the article W supported by the supporter 21, and also opposes the second side face 72 of the article W moving in the transfer direction Y relative to the supporter 21. Further, the second advance-retreat section 41 has a second body 43, which includes the second opposing face 42 opposing the second side face 72 of the article W that faces the second side X2 in the width direction X, and a second advance-retreat mechanism 48 that moves the second body 43 back and forth. The second body 43 in this example is a member having a plate-like section extending in the transfer direction Y and the up-down direction. The second body 43 has the second opposing face 42 as a face that faces the first side X1 in the width direction X. The second advance-retreat mechanism 48 includes a second fixed section 45, a second relay section 46 provided between the second body 43 and the second fixed section 45, and a second interlocking section 47 that interlocks the second relay section 46 and the second body 43.

The second fixed section 45 in this example is supported by the traveling body 12 with the position of the second fixed section 45 in the transfer direction Y fixed. Also, the second fixed section 45 is separated from the first fixed section 35 and located on the second side X2 in the width direction X relative the first fixed section 35. The second relay section 46 is so supported as to be movable in the transfer direction Y relative to the second fixed section 45. The second body 43 is so supported as to be movable in the transfer direction Y relative to the second relay section 46. The second interlocking section 47 moves the second body 43 relative to the second relay section 46 toward the side toward which the second relay section 46 moves in response to the second relay section 46 moving back or forth in the transfer direction Y relative to the second fixed section 45. The second body 43 in the shown example is supported by the second relay section 46 via a linear movement guide mechanism 15. Similarly, the second relay section 46 is supported by the second fixed section 45 via the linear movement guide mechanism 15. That is, the second body 43 and the second relay section 46 are guided by the linear movement guide mechanism 15 and move back and forth in the transfer direction Y.

The second advance-retreat section 41 in this example also includes a second driving mechanism 44, as shown in FIGS. 3, 4, and 5. The second driving mechanism 44 includes the drive shaft 34a, the advance-retreat motor 34M (see FIG. 8) that drives the drive shaft 34a to rotate, a second belt 44b disposed parallel with the transfer direction Y and turned by the rotation of the drive shaft 34a, and a second rack 44c that is provided in the second relay section 46 and meshes with the second belt 44b (see FIGS. 3 and 4). The second driving mechanism 44 drives the drive shaft 34a to rotate with use of the advance-retreat motor 34M, and turns the second belt 44b in a longitudinal direction thereof (transfer direction Y). The second driving mechanism 44 can thus move the second body 43 and the second relay section 46 toward the same side in the transfer direction Y. Thus, the second driving mechanism 44 in the present embodiment also uses the drive shaft 34a and the advance-retreat motor 34M of the first driving mechanism 34. Therefore, the first body 33, the first relay section 36, the second body 43, and the second relay section 46 synchronously move back and forth in the transfer direction Y. Note that the advance-retreat motor serving as a drive source of the second driving mechanism 44 may be a motor different from the advance-retreat motor serving as a drive source of the first driving mechanism 34.

3-3. Spacing Change Mechanism

The spacing change mechanism 80 in the present embodiment changes the spacing between the first advance-retreat section 31 and the second advance-retreat section 41 in the width direction X, as shown in FIGS. 2 and 3. The article transport facility 100 deals with articles W of various sizes. Therefore, the transfer device 1 is capable of transferring different types of articles W of different sizes. The spacing change mechanism 80 in the present embodiment changes the spacing between the first advance-retreat section 31 and the second advance-retreat section 41 in the width direction X in correspondence with the dimension of the article W in the width direction X. The first advance-retreat section 31 and the second advance-retreat section 41 guide movement of the article W in the transfer direction Y so that the article W is appropriately transferred to the transfer target location 11.

In the present embodiment, an article W whose first side face 71 protrudes toward the first side X1 in the width direction X above an upper-end section 32a of the first opposing face 32 and whose second side face 72 protrudes toward the second side X2 in the width direction X above an upper-end section 42a of the second opposing face 42 is referred to as a specific article Wt (see FIGS. 4 and 5). The first side face 71 of the specific article Wt includes a first protruding face 71a, which is a face located above the first opposing face 32 on the first side X1 in the width direction X relative to a face below the first protruding face 71a, and a first lower side face 71b, which is a face below the first protruding face 71a (here, a face opposing the first opposing face 32). The first protruding face 71a is located at a position protruding toward the first side X1 in the width direction X relative to the first lower side face 71b. Similarly, the second side face 72 has a second protruding face 72a, which is a face located above the second opposing face 42 on the second side X2 in the width direction X relative to a face below the second side face 72a, and a second lower side face 72b, which is a face below the second protruding face 72a (here, a face opposing the second opposing face 42). The second protruding face 72a is located at a position protruding toward the second side X2 in the width direction X relative to the second lower side face 72b. In this example, the spacing change mechanism 80 changes the spacing between the first advance-retreat section 31 and the second advance-retreat section 41 to a spacing corresponding to the dimension between the first lower side face 71b and the second lower side face 72b in the width direction X while the supporter 21 is supporting this type of specific article Wt. A specific configuration of the spacing change mechanism 80 will be described below.

The spacing change mechanism 80 includes a third belt 84A disposed parallel with the width direction X, and a spacing change motor 84M (see FIG. 8) that rotates the third belt 84A in the longitudinal direction thereof (width direction X), as shown in FIGS. 2 and 3. In this example, a part of the third belt 84A is joined to the second fixed section 45 of the second advance-retreat section 41. The spacing change mechanism 80 moves the second fixed section 45 joined to the third belt 84A in the width direction X by driving the third belt 84A with use of the spacing change motor 84M. This changes the spacing between the first advance-retreat section 31 and the second advance-retreat section 41 in the width direction X. The spacing change mechanism 80 in this example thus changes the spacing between the first advance-retreat section 31 and the second advance-retreat section 41 by moving, in the width direction X, only the second advance-retreat section 41, out of the first advance-retreat section 31 and the second advance-retreat 41. Note that the spacing change mechanism 80 may alternatively move both the first advance-retreat section 31 and the second advance-retreat section 41 in the width direction X.

3-4. First Hook Each first hook 5 is supported by the first advance-retreat section 31 and changes its position between a first retreat position Pr1 and a first protruding position Pt1 by pivoting about a first axis P1 parallel with the transfer direction Y, as shown in FIGS. 2, 3, 4, and 5. Each first hook 5 in the present embodiment pivots to change its position between the first retreat position Pr1 and the first protruding position Pt1.

The first advance-retreat section 31 in the present embodiment supports a plurality of first hooks 5. Specifically, the first hooks 5 are provided at both ends of the first body 33 in the transfer direction Y. In this example, the first hook 5 is also provided at the center of the first body 33 in the transfer direction Y. The first hooks 5 are driven by first pivot motors 50M (see FIG. 8) and pivot about the first axis P1. The plurality of (here, three) first hooks 5 are driven by the first pivot motors 50M corresponding to the respective first hooks 5 and pivot independently of each other.

The first retreat position Pr1 is a position in which the first hook 5 is parallel with the up-down direction, a first leading-end section 51, namely the leading-end section of the first hook 5 is located above the first axis P1, and the first hook 5 does not overlap the article W as viewed in the transfer direction Y, as shown in FIG. 4. In the present embodiment, the first hook 5 in the first retreat position Pr1 is parallel with the up-down direction, and the entire first hook 5 is located on the first side X1 in the width direction X relative to the article W supported by the supporter 21. Further, in the shown example, the entire first hook 5 in the first retreat position Pr1 is located on the outer side in the width direction X (first side X1 in the width direction X) relative to the first opposing face 32. The first leading-end section 51 in the first retreat position Pr1 is located above the first advance-retreat section 31. The first hook 5 includes the aforementioned first leading-end section 51, a first base 53 in which the first axis P1 is located, and a first joint 54 that joins the first leading-end section 51 to the first base 53. The first joint 54 in this example is a band-shaped section whose width gradually narrows as viewed in the transfer direction Y toward the first leading-end section 51. The first leading-end section 51 is a section of the first hook 5 on the leading-end side relative to the first joint 54, and has a larger width than the first joint 54 as viewed in the transfer direction Y. The first base 53 is a section on the first axis P1 side relative to the first joint 54, and has a larger width than the first joint 54 as viewed in the transfer direction Y. That is, in the first retreat position Pr1, the dimension of the first leading-end section 51 in the width direction X is larger than the dimension of a leading-end (upper-end) section of the first joint 54 in the width direction X, and the dimension of the first base 53 in the width direction X is larger than the dimension of a base-end (lower-end) section of the first joint 54 in the width direction X. In this example, the first leading-end section 51, the first base 53, and the first joint 54 are integrated. Further, the first hook 5 has a plate shape with an outer-edge section having a constant thickness in the transfer direction Y.

The first protruding position Pt1 is a position in which the first leading-end section 51 is located on the second side X2 in the width direction X relative to the position of the first leading-end section 51 in the first retreat position Pr1, and the first hook 5 overlaps the article W as viewed in the transfer direction Y, as shown in FIG. 5. In the first protruding position Pt1, a part of the first hook 5 is located on the inner side in the width direction X (second side X2 in the width direction X) relative to the first opposing face 32. In the present embodiment, the first leading-end section 51 in the first protruding position Pt1 is located on the second side X2 in the width direction X relative to the first advance-retreat section 31 and above the supporter 21 (here, the support plate 21*a*). Thus, upon the first hook 5 changing its position to the first protruding position Pt1, the first hook 5 overlaps the article W supported by the supporter 21 as viewed in the transfer direction Y. In the first protruding position Pt1 in this example, the first joint 54 and the first leading-end section 51 of the first hook 5 are located at positions overlapping the article W as viewed in the transfer direction Y (see FIG. 5). More specifically, a section of the first joint 54 excluding an end region on the first base 53 side and the first leading-end section 51 overlap the article W as viewed in the transfer direction Y.

A partial region E1 of a first side-edge section 52, which is an end edge, on the second side X2 in the width direction X, of the first hook 5 in the first retreat position Pr1, including at least the first leading-end section 51 has a shape that is, in the first retreat position Pr1, curved or bent to gradually extend toward the first side X1 in the width direction X while extending toward the first leading-end section 51, as shown in FIGS. 4 and 5. In the present embodiment, the partial region E1 of the first side-edge section 52 including at least the first leading-end section 51 has, in the first retreat position Pr1, a shape that is curved to gradually extend toward the first side X1 in the width direction X while extending toward the first leading-end section 51. The first side-edge section 52 in this example includes an end edge of the first leading-end section 51 on the second side X2 in the width direction X, an end edge of the first joint 54 on the second side X2 in the width direction X, and an end edge of the first base 53 on the second side X2 in the width direction X. The shape of the first hook 5 will be described below more specifically.

The first side-edge section 52 in the present embodiment has, in the first retreat position Pr1, a first base-side region 52*a*, which is a region on the first axis P1 side relative to the upper-end section 32*a* of the first opposing face 32, and a first leading-end-side region 52*b*, which is a region on the first leading-end section 51 side relative to the upper-end section 32*a* of the first opposing face 32, as shown in FIGS. 4 and 5. In the first retreat position Pr1 in this example, the first leading-end section 51 of the first hook 5 and a partial leading-end (upper-end) region of the first joint 54 protrude upward of the upper-end section 32*a* of the first opposing face 32. Therefore, the first leading-end-side region 52*b* includes an end edge of the first leading-end section 51 on the second side X2 in the width direction X, and an end edge of the partial leading-end (upper-end) region of the first joint 54 on the second side X2 in the width direction X. The first base-side region 52*a* includes, in the first retreat position Pr1, an end edge, on the second side X2 in the width direction X, of a partial base-end (lower-end) region of the first joint 54, which is located below the upper-end section 32*a* of the first opposing face 32, and an end edge of the first base 53 on the second side X2 in the width direction X. That is, the first base-side region 52*a* in the first retreat position Pr1 is a region of the first side-edge section 52 that is located on the base-end (lower-end) side relative to the first leading-end-side region 52*b*.

In the first retreat position Pr1 in the present embodiment, the first base-side region 52*a* has a linear shape parallel with the first opposing face 32, and the first leading-end-side region 52*b* has a shape that is curved or bent to gradually extend toward the first side X1 in the width direction X while extending toward the first leading-end section 51, as shown in FIG. 4. In this example, the first side-edge section 52 in the first retreat position Pr1 is curved, as a whole, toward the first side X1 in the width direction X while extending toward the leading end (upper end), and has a curvature radius that gradually decreases toward the leading end (upper end). Therefore, the first base-side region 52a in the first retreat position Pr1 is slightly curved but has a substantially linear shape parallel with the first opposing face 32 (i.e., parallel with the up-down direction). In the shown example, a leading-end (upper-end) section of the first base-side region 52a is spaced apart from the first opposing face 32 toward the first side X1 in the width direction X, and is slightly inclined relative to the first opposing face 32 (here, inclined about 5 degrees relative to the first opposing face 32). Thus, the "linear shape parallel with the first opposing face 32" includes any shape parallel with the first opposing face 32 as a whole even if this shape is curved or inclined to some extent. Meanwhile, the first leading-end-side region 52b is curved more than the first base-side region 52a and has a larger inclination angle relative to the first opposing face 32 than the first base-side region 52a. Thus, the first leading-end-side region 52b has a shape that is curved to gradually extend toward the outer side in the width direction (i.e., the side away from the article W) while extending toward the first leading-end section 51. As a result, the first leading-end-side region 52b in the first retreat position Pr1 is located on the first side X1 in the width direction X relative to the first base-side region 52a and is located more on the first side X1 in the width direction X while extending toward the first leading-end section 51.

As mentioned above, the spacing change mechanism 80 in the present embodiment changes the spacing between the first advance-retreat section 31 and the second advance-retreat section 41 in the width direction X to a spacing corresponding to the dimension of the article W in the width direction X in response to the supporter 21 supporting the article W. In the present embodiment, the first side-edge section 52 in the first retreat position Pr1 is located on the first side X1 in the width direction X relative to the first side face 71 of the specific article Wt as viewed in the transfer direction Y while the first opposing face 32 is in contact with the first side face 71 of the specific article Wt, as shown in FIG. 4. In this example, the first base-side region 52a of the first side-edge section 52 in the first retreat position Pr1 is located on the first side X1 in the width direction X relative to the first lower side face 71b of the first side face 71 of the article W. Further, the first leading-end-side region 52b of the first side-edge section 52 in the first retreat position Pr1 is located on the first side X1 in the width direction X relative to the first protruding face 71a of the first side face 71 of the article W. The above-described shape of the first side-edge section 52 of the first hook 5 realizes the locational relationship between the first hook 5 and the article W in which the first protruding face 71a protruding toward the first side X1 in the width direction X relative to the first lower side face 71b does not interfere with the first leading-end-side region 52b of the first side-edge section 52.

In the first retreat position Pr1 in the present embodiment, a section of the first hook 5 below an upper end 33a of the first body 33 is so disposed as not to interfere with the first advance-retreat mechanism 38 that relatively moves in the transfer direction Y with respect to the first body 33, as shown in FIG. 4. Furthermore, in the first retreat position Pr1 in this example, a section of the first hook 5 below the upper end 33a of the first body 33 is so disposed as not to interfere with the first driving mechanism 34 either. Specifically, the entire first joint 54 and the first base 53 of the first hook 5 are so disposed as not to interfere with both the first advance-retreat mechanism 38 and the first driving mechanism 34. In the first retreat position Pr1 in the shown example, the first joint 54 and the first base 53 are so disposed as not to overlap, as viewed in the transfer direction Y, the first fixed section 35, the first relay section 36, and the first interlocking section 37 that constitute the first advance-retreat mechanism 38, the first driving mechanism 34 (drive shaft 34a, advance-retreat motors 34M, first belt 34b, first rack 34c), and the plurality of linear movement guide mechanisms 15. In the first retreat position Pr1 in this example, the first joint 54 is parallel with the first opposing face 32, thereby preventing the first hook 5 from interfering with the first advance-retreat mechanism 38 and the first driving mechanism 34 while the first body 33 is moving back and forth.

In this example, interference between a section of the specific article Wt above the first body 33 and the first hook 5 is avoided by disposing the first leading-end section 51 at a position overlapping the first relay section 36 as viewed in the up-down direction in the first retreat position Pr1. Furthermore, the first hook 5 having a shape that is curved to gradually extend toward the first side X1 in the width direction X while extending toward the first leading-end section 51 side (upward) in the first retreat position Pr1 as described above eliminates the need for disposing the entire first hook 5 on the first side X1 in the width direction X in order to avoid interference with the specific article Wt, and allows only the first leading-end section 51 to be disposed on the first side X1 in the width direction X relative to the specific article Wt. Accordingly, the first joint 54 and the first base 53 can be so disposed as not to interfere with the first advance-retreat mechanism 38 and the first driving mechanism 34.

3-5. Second Hook

Each second hook 6 is supported by the second advance-retreat section 41 and changes its position between a second retreat position Pr2 and a second protruding position Pt2 by pivoting about a second axis P2 parallel with the transfer direction Y, as shown in FIGS. 2, 3, 4, and 5. Each second hook 6 in the present embodiment pivots to change its position between the second retreat position Pr2 and the second protruding position Pt2. Note that the second hook 6 has the same configuration as the first hook 5.

The second advance-retreat section 41 in the present embodiment supports a plurality of second hooks 6. Specifically, the second hooks 6 are provided at both ends of the second body 43 in the transfer direction Y. In this example, the second hook 6 is also provided at the center of the second body 43 in the transfer direction Y. The second hooks 6 are driven by second pivot motors 60M (see FIG. 8) and pivot about the second axis P2. The plurality of (here, three) second hooks 6 are driven by the second pivot motors 60M corresponding to the respective second hooks 6 and pivot independently of each other.

The second retreat position Pr2 is a position in which the second hook 6 is parallel with the up-down direction, a second leading-end section 61, namely the leading-end section of the second hook 6 is located above the second axis P2, and the second hook 6 does not overlap the article W as viewed in the transfer direction Y, as shown in FIG. 4. In the present embodiment, the second hook 6 in the second retreat position Pr2 is parallel with the up-down direction, and the entire second hook 6 is located on the second side X2 in the width direction X relative to the article W supported by the supporter 21. Further, in the shown example, the entire second hook 6 in the second retreat position Pr2 is located on the outer side in the width direction X (second side X2 in the width direction X) relative to the second opposing face 42. The second leading-end section 61 in the second retreat position Pr2 is located above the second advance-retreat section 41. The second hook 6 includes the aforementioned second leading-end section 61, a second base 63 in which the second axis P2 is located, and a second joint 64 that joins the second leading-end section 61 to the second base 63. The second joint 64 in this example is a band-shaped section whose width gradually narrows as viewed in the transfer direction Y toward the second leading-end section 61. The second leading-end section 61 is a section of the second hook 6 on the leading-end side relative to the second joint 64, and has a larger width than the second joint 64 as viewed in the transfer direction Y. The second base 63 is a section on the second axis P2 side relative to the second joint 64, and has a larger width than the second joint 64 as viewed in the transfer direction Y. That is, in the second retreat position Pr2, the dimension of the second leading-end section 61 in the width direction X is larger than the dimension of a leading-end (upper-end) section of the second joint 64 in the width direction X, and the dimension of the second base 63 in the width direction X is larger than the dimension of a base-end (lower-end) section of the second joint 64 in the width direction X. In this example, the second leading-end section 61, the second base 63, and the second joint 64 are integrated. Further, the second hook 6 has a plate shape with an outer-edge section having a constant thickness in the transfer direction Y.

The second protruding position Pt2 is a position in which the second leading-end section 61 is located on the first side X1 in the width direction X relative to the position of the second leading-end section 61 in the second retreat position Pr2, and the second hook 6 overlaps the article W as viewed in the transfer direction Y, as shown in FIG. 5. In the second protruding position Pt2, a part of the second hook 6 is located on the inner side in the width direction X (first side X1 in the width direction X) relative to the second opposing face 42. In the present embodiment, the second leading-end section 61 in the second protruding position Pt2 is located on the first side X1 in the width direction X relative to the second advance-retreat section 41 and above the supporter 21 (here, the support plate 21a). Thus, upon the second hook 6 changing its position to the second protruding position Pt2, the second hook 6 overlaps the article W supported by the supporter 21 as viewed in the transfer direction Y. In the second protruding position Pt2 in this example, the second joint 64 and the second leading-end section 61 of the second hook 6 are located at positions overlapping the article W as viewed in the transfer direction Y (see FIG. 5). More specifically, a section of the second joint 64 excluding an end region on the second base 63 side and the second leading-end section 61 overlap the article W as viewed in the transfer direction Y.

A partial region E2 of a second side-edge section 62, which is an end edge, on the first side X1 in the width direction X, of the second hook 6 in the second retreat position Pr2, including at least the second leading-end section 61 has a shape that is, in the second retreat position Pr2, curved or bent to gradually extend toward the second side X2 in the width direction X while extending toward the second leading-end section 61, as shown in FIGS. 4 and 5. In the present embodiment, the partial region E2 of the second side-edge section 62 including at least the second leading-end section 61 has, in the second retreat position Pr2, a shape that is curved to gradually extend toward the second side X2 in the width direction X while extending toward the second leading-end section 61. The second side-edge section 62 in this example includes an end edge of the second leading-end section 61 on the first side X1 in the width direction X, an end edge of the second joint 64 on the first side X1 in the width direction X, and an end edge of the second base 63 on the first side X1 in the width direction X. The shape of the second hook 6 will be described below more specifically.

The second side-edge section 62 in the present embodiment has, in the second retreat position Pr2, a second base-side region 62a, which is a region on the second axis P2 side relative to the upper-end section 42a of the second opposing face 42, and a second leading-end-side region 62b, which is a region on the second leading-end section 61 side relative to the upper-end section 42a of the second opposing face 42, as shown in FIGS. 4 and 5. In the second retreat position Pr2 in this example, the second leading-end section 61 of the second hook 6 and a partial leading-end (upper-end) region of the second joint 64 protrude upward of the upper-end section 42a of the second opposing face 42. Therefore, the second leading-end-side region 62b includes an end edge of the second leading-end section 61 on the first side X1 in the width direction X, and an end edge of the partial leading-end (upper-end) region of the second joint 64 on the first side X1 in the width direction X. The second base-side region 62a includes, in the second retreat position Pr2, an end edge, on the first side X1 in the width direction X, of a partial base-end (lower-end) region of the second joint 64 that is located below the upper-end section 42a of the second opposing face 42, and an end edge of the second base 63 on the first side X1 in the width direction X. That is, the second base-side region 62a in the second retreat position Pr2 is a region of the second side-edge section 62 that is located on the base-end (lower-end) side relative to the second leading-end-side region 62b.

In the second retreat position Pr2 in the present embodiment, the second base-side region 62a has a linear shape parallel with the second opposing face 42, and the second leading-end-side region 62b has a shape that is curved or bent to gradually extend toward the second side X2 in the width direction X while extending toward the second leading-end section 61, as shown in FIG. 4. In this example, the second side-edge section 62 in the second retreat position Pr2 is curved, as a whole, toward the second side X2 in the width direction X while extending toward the leading end (upper end), and has a curvature radius that gradually decreases toward the leading end (upper end). Therefore, the second base-side region 62a in the second retreat position Pr2 is slightly curved but has a substantially linear shape parallel with the second opposing face 42 (i.e., parallel with the up-down direction). In the shown example, a leading-end (upper-end) section of the second base-side region 62a is spaced apart from the second opposing face 42 toward the second side X2 in the width direction X, and is slightly inclined relative to the second opposing face 42 (here, inclined about 5 degrees relative to the second opposing face 42). Thus, the "linear shape parallel with the second opposing face 42" includes any shape parallel with the second opposing face 42 as a whole even if this shape is curved or inclined to some extent. Meanwhile, the second leading-end-side region 62b is curved more than the second base-side region 62a and has a larger inclination angle relative to the second opposing face 42 than the second base-side region 62a. Thus, the second leading-end-side region 62b has a shape that is curved to gradually extend toward the outer side in the width direction (i.e., the side away from the article W) while extending toward the second leading-end section 61. As a result, the second leading-end-side region 62b in the second retreat position Pr2 is located on the second side X2 in the width direction X relative to the second base-side region 62a, and is located more on the second side X2 in the width direction X while extending toward the second leading-end section 61.

As mentioned above, the spacing change mechanism 80 in the present embodiment changes the spacing between the first advance-retreat section 31 and the second advance-retreat section 41 in the width direction X to a spacing corresponding to the dimension of the article W in the width direction X in response to the supporter 21 supporting the article W. In the present embodiment, the second side-edge section 62 in the second retreat position Pr2 is located on the second side X2 in the width direction X relative to the second side face 72 of the specific article Wt as viewed in the transfer direction Y while the second opposing face 42 is in contact with the second side face 72 of the specific article Wt, as shown in FIG. 4. In this example, the second base-side region 62a of the second side-edge section 62 in the second retreat position Pr2 is located on the second side X2 in the width direction X relative to the second lower side face 72b of the second side face 72 of the article W. Further, the second leading-end-side region 62b of the second side-edge section 62 in the second retreat position Pr2 is located on the second side X2 in the width direction X relative to the second protruding face 72a of the second side face 72 of the article W. The above-described shape of the second side-edge section 62 of the second hook 6 realizes the locational relationship between the second hook 6 and the article W in which the second protruding face 72a protruding toward the second side X2 in the width direction X relative to the second lower side face 72b does not interfere with the second leading-end-side region 62b of the second side-edge section 62.

In the second retreat position Pr2 in the present embodiment, a section of the second hook 6 below an upper end 43a of the second body 43 is so disposed as not to interfere with the second advance-retreat mechanism 48 that relatively moves in the transfer direction Y with respect to the second body 43, as shown in FIG. 4. Furthermore, in the second retreat position Pr2 in this example, a section of the second hook 6 below the upper end 43a of the second body 43 is so disposed as not to interfere with the second driving mechanism 44 either. Specifically, the entire second joint 64 and the second base 63 of the second hook 6 are so disposed as not to interfere with both the second advance-retreat mechanism 48 and the second driving mechanism 44. In the second retreat position Pr2 in the shown example, the second joint 64 and the second base 63 are so disposed as not to overlap, as viewed in the transfer direction Y, the second fixed section 45, the second relay section 46, and the second interlocking section 47 that constitute the second advance-retreat mechanism 48, the second driving mechanism 44 (drive shaft 34a, advance-retreat motors 34M, second belt 44b, second rack 44c), and the plurality of linear movement guide mechanisms 15. In the second retreat position Pr2 in this example, the second joint 64 is parallel with the second opposing face 42, thereby preventing the second hook 6 from interfering with the second advance-retreat mechanism 48 and the second driving mechanism 44 while the second body 43 is moving back and forth.

In this example, interference between a section of the specific article Wt above the second body 43 and the second hook 6 is avoided by disposing the second leading-end section 61 at a position overlapping the second relay section 46 as viewed in the up-down direction in the second retreat position Pr2. Furthermore, the second hook 6 having a shape that is curved to gradually extend toward the second side X2 in the width direction X while extending toward the second leading-end section 61 side (upward) in the second retreat position Pr2 as described above eliminates the need for disposing the entire second hook 6 on the second side X2 in the width direction X in order to avoid interference with the specific article Wt, and allows only the second leading-end section 61 to be disposed on the second side X2 in the width direction X relative to the specific article Wt. Accordingly, the second joint 64 and the second base 63 can be so disposed as not to interfere with the second advance-retreat mechanism 48 and the second driving mechanism 44.

3-6. Stopper

The transfer device 1 in the present embodiment also includes first stoppers 91 that come into contact with the first hooks 5 in the first retreat position Pr1 from the first side X1 in the width direction X, and second stoppers 92 that come into contact with the second hooks 6 in the second retreat position Pr2 from the second side X2 in the width direction X, as shown in FIG. 3. The first stoppers 91 and the second stoppers 92 in this example have the same configuration. The first stoppers 91 restrain the first hooks 5 from further moving outward in the width direction (toward the first side X1 in the width direction X) from the first retreat position Pr1. Similarly, the second stoppers 92 restrict the second hooks 6 from further moving outward in the width direction (toward the second side X2 in the width direction X) from the second retreat position Pr2. The first stoppers 91 in this example are provided on the first advance-retreat section 31. More specifically, a plurality of (here, three) first stoppers 91 are attached to an upper part of the first body 33 in correspondence with the respective first hooks 5. Similarly, a plurality of (here, three) second stoppers 92 are attached to an upper part of the second body 43 in correspondence with the respective second hooks 6. Each first stopper 91 in the shown example comes into contact with a section of the first joint 54 of a corresponding first hook 5 that is above the upper-end section 32a of the first opposing face 32 from the first side X1 in the width direction X. Each second stopper 92 comes into contact with a section of the second joint 64 of a corresponding second hook 6 that is above the upper-end section 42a of the second opposing face 42 from the second side X2 in the width direction X.

4. Control Unit

Figure 8:
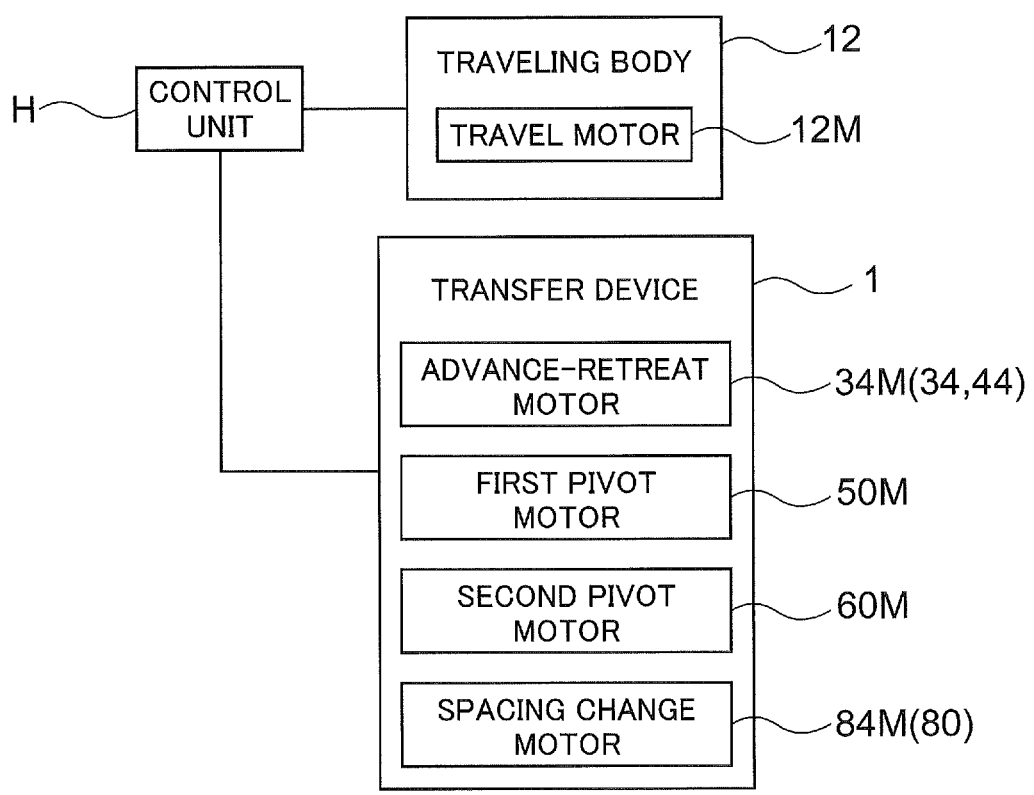
FIG. 8 is a control block diagram.

The article transport vehicle 10 includes a control unit H that controls each part, as shown in FIG. 8. The control unit H controls the operation of the traveling body 12 and the transfer device 1. More specifically, the control unit H controls the travel motor 12M, the advance-retreat motor 34M, the first pivot motors 50M, the second pivot motors 60M, and the spacing change motor 84M. The control unit H includes, for example, a processor such as a microcomputer, peripheral circuits such as memory, and the like. Each function is realized by cooperation of these pieces of hardware and programs executed on processors of a computer or the like.

Figure 6:
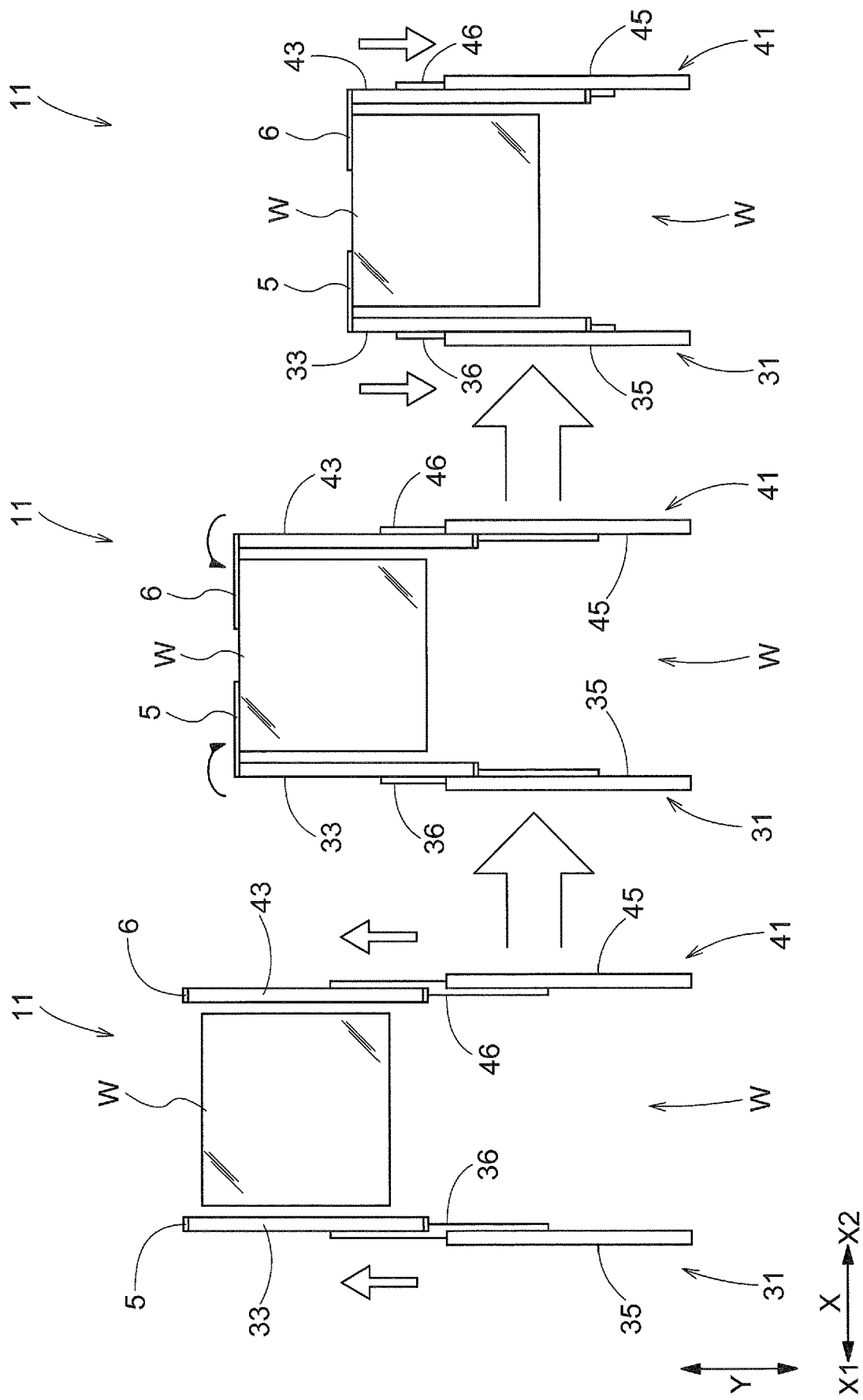
FIG. 6 is a plan view schematically showing an article transfer operation.
Figure 7:
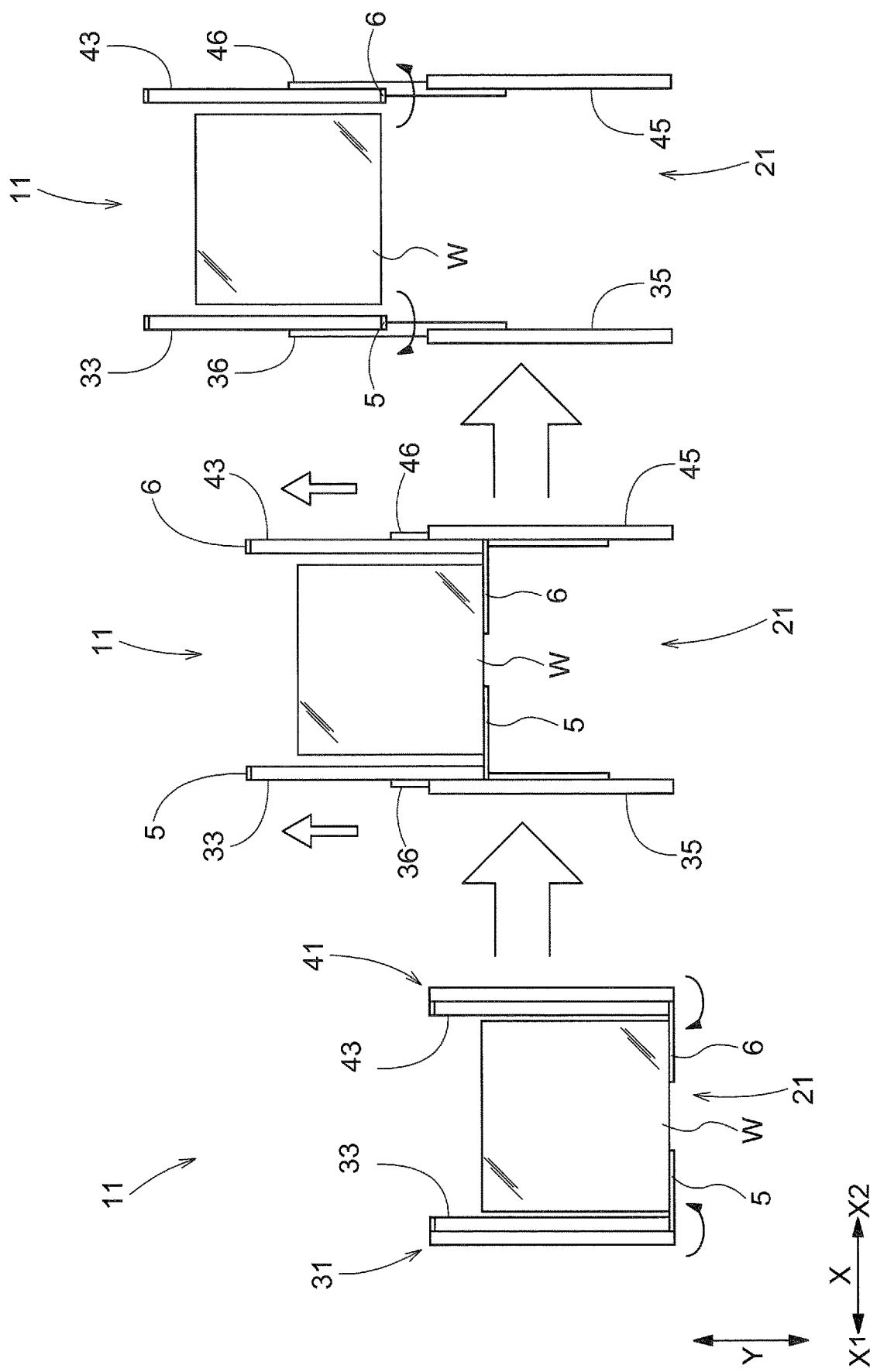
FIG. 7 is a plan view schematically showing an article transfer operation.

The control unit H performs, as operations to transfer the article W, a pick-up operation to transfer the article W from the transfer target location 11 to the supporter 21, and a delivery operation to transfer the article W from the supporter 21 to the transfer target location 11, as shown in FIGS. 6 and 7.

When executing the pick-up operation, the control unit H controls the spacing change motor 84M to set the spacing between the first advance-retreat section 31 and the second advance-retreat section 41 in the width direction X to a spacing corresponding to the dimension, in the width direction X, of the article W to be transferred, as shown in FIG. 6. The control unit H then controls the advance-retreat motor 34M to cause the first advance-retreat section 31 and the second advance-retreat section 41 to protrude toward the transfer target location 11 such that a first hook 5 and a second hook 6 are disposed at positions on the distal side in the transfer direction Y relative to the article W in the transfer target location 11 (see the left figure and the figure at the center in FIG. 6). The control unit H thereafter controls the first pivot motors 50M and the second pivot motors 60M to change the position of the first hook 5 from the first retreat position Pr1 to the first protruding position Pt1 and change the position of the second hook 6 from the second retreat position Pr2 to the second protruding position Pt2 (see the figure at the center in FIG. 6). The control unit H then controls the advance-retreat motor 34M to cause the first advance-retreat section 31 and the second advance-retreat section 41 to retreat toward the supporter 21 (see the right figure in FIG. 6). The control unit H thus executes the pick-up operation by pulling the article W toward the supporter 21 with the first hook 5 and the second hook 6 in contact with the article W in the transfer target location 11.

When executing the delivery operation, the control unit H controls the spacing change motor 84M to set the spacing between the first advance-retreat section 31 and the second advance-retreat section 41 in the width direction X to a spacing corresponding to the dimension, in the width direction X, of the article W to be transferred, as shown in FIG. 7. The control unit H then controls the advance-retreat motor 34M and adjusts the positions of the first advance-retreat section 31 and the second advance-retreat section 41 in such a manner as to dispose a first hook 5 and a second hook 6 at positions on the proximal side in the transfer direction Y relative to the article W on the supporter 21. The control unit H thereafter controls the first pivot motors 50M and the second pivot motors 60M to change the position of the first hook 5 from the first retreat position Pr1 to the first protruding position Pt1 and change the position of the second hook 6 from the second retreat position Pr2 to the second protruding position Pt2 (see the left figure in FIG. 7). The control unit H then controls the advance-retreat motor 34M and causes the first advance-retreat section 31 and the second advance-retreat section 41 to protrude toward the transfer target location 11 (see the central figure in FIG. 7). The control unit H thus executes the delivery operation by pushing the article W toward the transfer target location 11 with the first hook 5 and the second hook 6 in contact with the article W on the supporter 21. The control unit H thereafter changes the position of the first hook 5 from the first protruding position Pt1 to the first retreat position Pr1, and changes the position of the second hook 6 from the second protruding position Pt2 to the second retreat position Pr2 (see the right figure in FIG. 7).

Second Embodiment

Figure 9:
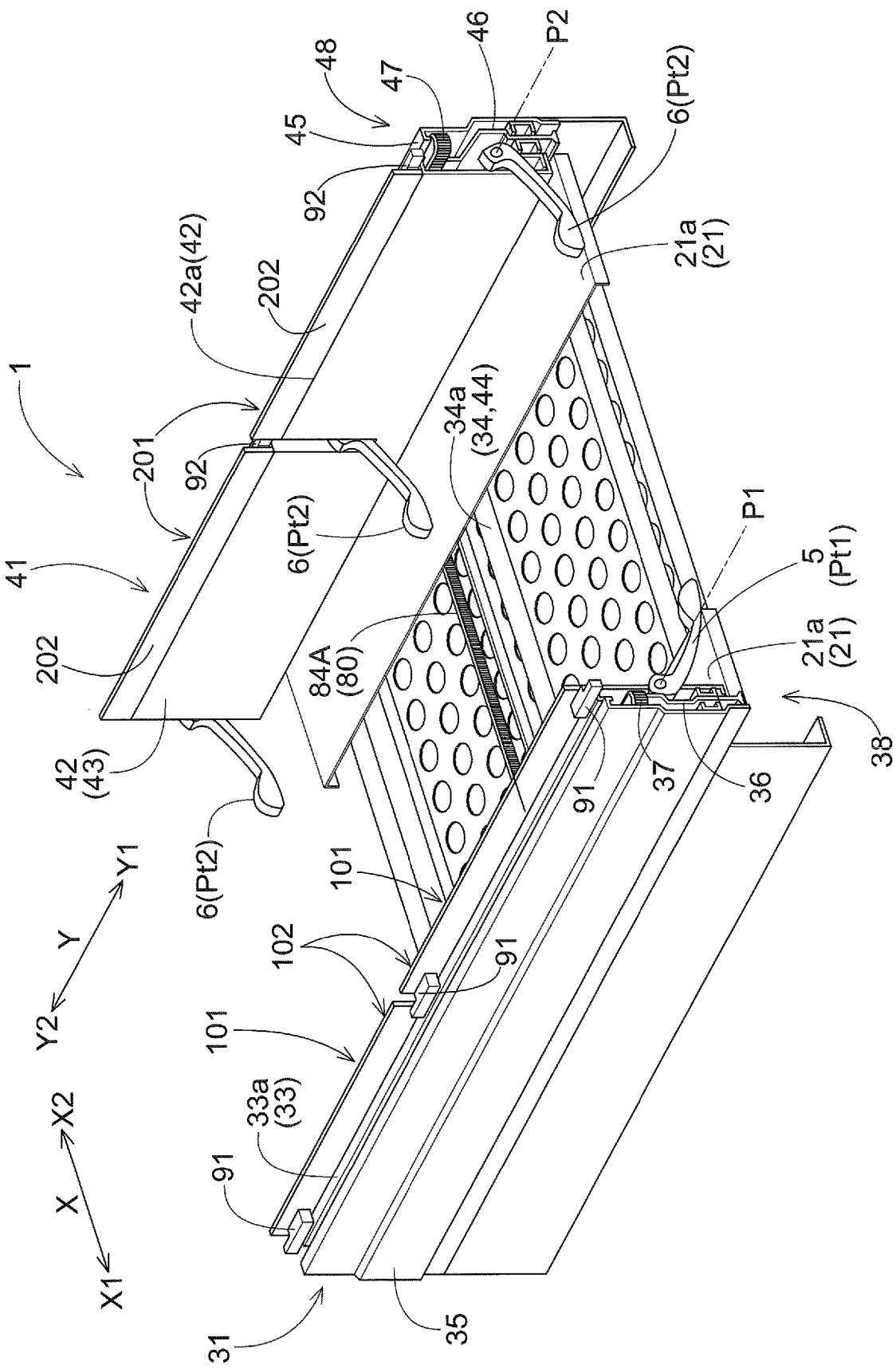
FIG. 9 is a perspective view of a transfer device according to the second embodiment.

Next, the second embodiment of the transfer device will be described with reference to the drawings (FIGS. 9 and 10). The following description of the transfer device in the present embodiment focuses on differences from the first embodiment. Features not specifically described are the same as the first embodiment, and a description thereof is omitted by assigning the same reference numerals.

The transfer device 1 in the present embodiment includes a first extension member 101 and a second extension member 201, as shown in FIGS. 9 and 10. The first extension member 101 and the second extension member 201 in this example have the same configuration.

The first extension member 101 in the present embodiment is attached to an upper part of the first body 33. The first extension member 101 in this example is attached to a position at which the first extension member 101 does not interfere with the first hooks 5 and the first stoppers 91. Further, the first extension member 101 in the present embodiment has a third opposing face 102 that extends upward from the first opposing face 32 and parallel with the first opposing face 32 at the same position in the width direction X as the first opposing face 32. That is, the third opposing face 102 is located on the second side X2 in the width direction X relative to the first leading-end-side region 52b of each first hook 5. The first extension member 101 in this example extends in the width direction X and the up-down direction, and the third opposing face 102 is a face of the first extension member 101 that faces the second side X2 in the width direction X. The third opposing face 102 has a rectangular shape. The first extension member 101 in the shown example is an L-shaped bracket. The first extension member 101 is fixed to a face of the first body 33 that faces upward by a fastening member (not shown).

The second extension member 201 in the present embodiment is attached to an upper part of the second body 43. The second extension member 201 in this example is attached to a position at which the second extension member 201 does not interfere with the second hooks 6 and the second stoppers 92. The second extension member 201 has a fourth opposing face 202 that extends upward from the second opposing face 42 and parallel with the second opposing face 42 at the same position in the width direction X as the second opposing face 42. That is, the fourth opposing face 202 is located on the first side X1 in the width direction X relative to the second leading-end-side region 62b of each second hook 6. The second extension member 201 in this example extends in the width direction X and the up-down direction, and the fourth opposing face 202 is a face of the second extension member 201 that faces the first side X1 in the width direction X. The fourth opposing face 202 has a rectangular shape. The second extension member 201 in the shown example is an L-shaped bracket. The second extension member 201 is fixed to a face of the second body 43 that faces upward by a fastening member (not shown).

The transfer device 1 in the present embodiment has the first extension member 101 and the second extension member 201 in such a manner as to be capable of appropriately performing the operations to transfer the specific article Wt, as shown in FIG. 10. The specific article Wt in this example has a first protruding face 71a of the first side face 71 that protrudes toward the first side X1 in the width direction X relative to the first lower side face 71b at a position that is above the upper-end section 32a of the first opposing face 32 and at least below the upper end of each first hook 5, and a second protruding face 72a of the second side face 72 that protrudes toward the second side X2 in the width direction X relative to the second lower side face 72b at a position that is above the upper-end section 42a of the second opposing face 42 and at least below the upper end of each second hook 6.

In the example shown in FIG. 10, the position of the lower end of the first protruding face 71a of the specific article Wt is immediately above the upper-end section 32a of the first opposing face 32. Similarly, the position of the lower end of the second protruding face 72a of the specific article Wt is immediately above the upper-end section 42a of the second opposing face 42. Therefore, the third opposing face 102 opposes the first protruding face 71a. Similarly, the fourth opposing face 202 opposes the second protruding face 72a. If this type of specific article Wt is placed on the pair of support plates 21a, the spacing change motor 84M drives the first advance-retreat section 31 and the second advance-retreat section 41 to approach each other in the width direction X, then the third opposing 102 comes into contact with the first protruding face 71*a*, and the fourth opposing face 202 comes into contact with the second opposing face 72*a*. This can prevent a section of each first hook 5 that is above the upper-end section 32*a* of the first opposing face 32 from interfering with the first protruding face 71*a*. Similarly, a section of each second hook 6 that is above the upper-end section 42*a* of the second opposing face 42 can be prevented from interfering with the second protruding face 72*a*.

Other Embodiments

Next, other embodiments of the article transport facility will be described.

(1) The above embodiments have described examples of a configuration in which the partial region E1 of the first side-edge section 52 that includes at least the first leading-end section 51 is, in the first retreat position Pr1, curved to gradually extend toward the first side X1 in the width direction X while extending toward the first leading-end section 51, and the partial region E2 of the second side-edge section 62 that includes at least the second leading-end section 61 is, in the second retreat position Pr2, curved to gradually extend toward the second side X2 in the width direction X while extending toward the second leading-end section 61. However, there is no limitation to this configuration. The partial region E1 of the first side-edge section 52 that includes at least the first leading-end section 51 may alternatively be, in the first retreat position Pr1, bent to gradually extend toward the first side X1 in the width direction X while extending toward the first leading-end section 51, and the partial region E2 of the second side-edge section 62 that includes at least the second leading-end section 61 may alternatively be, in the second retreat position Pr2, bent to gradually extend toward the second side X2 in the width direction X while extending toward the second leading-end section 61. FIG. 11 shows an example of this configuration.

The first side-edge section 52 of each first hook 5 in this example has a shape that is bent in a boundary area between the first base-side region 52*a* and the first leading-end-side region 52*b*, as shown in FIG. 11. In the first retreat position Pr1, the first base-side region 52*a* has a linear shape parallel with the first opposing face 32, and the first leading-end-side region 52*b* has a linear shape that gradually extends toward the first side X1 in the width direction X while extending toward the first leading-end section 51. Similarly, the second side-edge section 62 of each second hook 6 has a shape that is bent in a boundary area between the second base-side region 62*a* and the second leading-end-side region 62*b*. In the second retreat position Pr2, the second base-side region 62*a* has a linear shape parallel with the second opposing face 42, and the second leading-end-side region 62*b* has a linear shape that gradually extends toward the second side X2 in the width direction X while extending toward the second leading-end section 61. This configuration can also make it easy to prevent the first hooks 5 in the first retreat position Pr1 and the second hooks 6 in the second retreat position Pr2 from interfering with the specific article Wt. In the shown example, a bent section is formed in a part of the first side-edge section 52 of each first hook 5 and a part of the second side-edge section 62 of each second hook 6. However, bent sections may alternatively be formed in a plurality of parts of the first side-edge section 52. Similarly, bent sections may be formed in a plurality of parts of the second side-edge section 62 of each second hook 6.

(2) The above embodiments have described examples of a configuration in which the first base-side region 52*a* of each first hook 5 in the first retreat position Pr1 has a linear shape parallel with the first opposing face 32, and the second base-side region 62*a* of each second hook 6 in the second retreat position Pr2 has a linear shape parallel with the second opposing face 42. However, the shapes of the first base-side region 52*a* and the second base-side region 62*a* are not limited thereto, and may alternatively have any of various other shapes. For example, each of the first base-side region 52*a* and the second base-side region 62*a* may have a shape that is curved in an arc shape or a wave shape. In this case as well, it is preferable that the entire first base-side region 52*a* in the first retreat position Pr1 is located on the outer side in the width direction (first side X1 in the width direction X) relative to the first opposing face 32. Similarly, it is preferable that the entire second base-side region 62*a* in the second retreat position Pr2 is located on the outer side in the width direction (second side X2 in the width direction X) relative to the second opposing face 42.

(3) The above embodiments have described examples of a configuration in which the transfer device 1 includes a spacing change mechanism 80 that changes the spacing between the first advance-retreat section 31 and the second advance-retreat section 41 in the width direction X. However, there is no limitation to this configuration, and the transfer device 1 need not include the spacing change mechanism 80, for example.

(4) The above embodiments have described examples of a configuration in which the transfer device 1 includes first stoppers 91 that come into contact with the first hooks 5 in the first retreat position Pr1 from the first side X1 in the width direction X, and second stoppers 92 that come into contact with the second hooks 6 in the second retreat position Pr2 from the second side X2 in the width direction X. However, there is no limitation to this configuration, and the transfer device 1 need not include the first stoppers 91 or the second stoppers 92.

(5) Configurations disclosed in the above-described embodiments (including the above embodiments and other embodiments; the same applied hereinafter) can also be applied in combination with configurations disclosed in any other embodiment as long as no contradiction arises. As for any other configurations, the embodiments disclosed herein are illustrative in all respects and can be appropriately modified without departing from the gist of the present disclosure.

Summary of The Above Embodiment

The summary of the above-described transfer device will be described below.

A transfer device is configured to perform a transfer operation to move an article in a transfer direction between a supporter configured to support the article and a transfer target location, and the transfer device includes: a first advance-retreat section configured to move back and forth in the transfer direction relative to the supporter; a second advance-retreat section located on a second side in a width direction, which is orthogonal to the transfer direction as viewed in an up-down direction, relative to the first advance-retreat section and configured to move back and forth in the transfer direction relative to the supporter, the second side in the width direction being one side in the width direction; a first hook supported by the first advance-retreat section and configured to change in position between a first retreat position and a first protruding position by pivoting about a first axis parallel with the transfer direction; and a second hook supported by the second advance-retreat section and configured to change in position between a second retreat position and a second protruding position by pivoting about a second axis parallel with the transfer direction, wherein the first retreat position is a position in which the first hook is parallel with the up-down direction, a leading-end section, which is a leading-end section of the first hook, is above the first axis, and the first hook does not overlap the article as viewed in the transfer direction, the first protruding position is a position in which the first leading-end section is on the second side in the width direction relative to a position of the first leading-end section in the first retreat position, and the first hook overlaps the article as viewed in the transfer direction, the second retreat position is a position in which the second hook is parallel with the up-down direction, a second leading-end section, which is a leading-end section of the second hook, is above the second axis, and the second hook does not overlap the article as viewed in the transfer direction, the second protruding position is a position in which the second leading-end section is on a first side in the width direction relative to a position of the second leading-end section in the second retreat position, and the second hook overlaps the article as viewed in the transfer direction, the first side in the width direction being another side in the width direction, the first hook has a first side-edge section that is an end edge on the second side in the width direction in the first retreat position, and the first side-edge section includes a partial region including at least the first leading-end section and having a shape that is, in the first retreat position, curved or bent to gradually extend toward the first side in the width direction while extending toward the first leading-end section, and the second hook has a second side-edge section that is an end edge on the first side in the width direction in the second retreat position, and the second side-edge section includes a partial region including at least the second leading-end section and having a shape that is, in the second retreat position, curved or bent to gradually extend toward the second side in the width direction while extending toward the second leading-end section.

Some of the articles transferred by the transfer device have an upper section whose dimension in the width direction is larger than the dimension of a lower section in the width direction. According to this configuration, it is easy to avoid interference between this type of article and a leading-end-side region of the first hook and a leading-end-side region of the second hook in the retreat position.

Further, the first hook and the second hook in the retreat position need not be unnecessarily pivoted outward in the width direction to avoid such interference. Accordingly, it is possible to keep low the amount that each of the first and second hooks pivots for a position change between the retreat position and the protruding position. This makes it easy to shorten the time required to change the positions of the first and second hooks.

It is preferable that the first advance-retreat section has a first opposing face opposing a first side face of the article that faces the first side in the width direction, the second advance-retreat section has a second opposing face opposing a second side face of the article that faces the second side in the width direction, the first side edge has, in the first retreat position, a first base-side region that is a region on the first axis side relative to an upper-end section of the first opposing face, and a first leading-end-side region that is a region on the first leading-end section side relative to the upper-end section of the first opposing face, the first side-edge section has a curved or bent shape according to which, in the first retreat position, (i) the first base-side region has a linear shape parallel with the first opposing face, and (ii) the first leading-end-side region gradually extends toward the first side in the width direction while extending toward the first leading-end section, the second side edge has, in the second retreat position, a second base-side region that is a region on the second axis side relative to an upper-end section of the second opposing face, and a second leading-end-side region that is a region on the second leading-end section side relative to the upper-end section of the second opposing face, and the second side-edge section has a curved or bent shape according to which, in the second retreat position, (i) the second base-side region has a linear shape parallel with the second opposing face, and (ii) the second leading-end-side region gradually extends toward the second side in the width direction while extending toward the second leading-end section.

According to this configuration, the first base-side region of the first hook in the first retreat position has a linear shape parallel with the first opposing face, and therefore does not protrude toward the article and can avoid interference with the article. Similarly, the second base-side region of the second hook in the second retreat position also has a linear shape parallel with the second opposing face, and therefore does not protrude toward the article and can avoid interference with the article. Meanwhile, the first leading-end-side region, which is a section of the first hook that is above the upper end of the first opposing face, has a shape that is curved or bent to gradually extend outward in the width direction while extending toward the first leading-end section. Therefore, the first leading-end-side region of the first hook can appropriately avoid interfering with an article having an upper section whose dimension in the width direction is larger than the dimension of a lower section in the width direction. Similarly, the second leading-end-side region, which is a section of the second hook that is above the upper end of the second opposing face, has a shape that is curved or bent to gradually extend outward in the width direction while extending toward the second leading-end section. Therefore, the second leading-end-side region of the second hook can appropriately avoid interfering with an article having an upper section whose dimension in the width direction is larger than the dimension of a lower section in the width direction.

It is preferable that the transfer device further includes a spacing change mechanism configured to change a spacing between the first advance-retreat section and the second advance-retreat section in the width direction, wherein the first advance-retreat section has a first opposing face opposing a first side face of the article that faces the first side in the width direction, the second advance-retreat section has a second opposing face opposing a second side face of the article that faces the second side in the width direction, the article whose first side face protrudes toward the first side in the width direction above an upper-end section of the first opposing face and whose second face protrudes toward the second side in the width direction above an upper-end section of the second opposing face is a specific article, the first side-edge section in the first retreat position is on the first side in the width direction relative to the first side face of the specific article as viewed in the transfer direction while the first opposing face is in contact with the first side face of the specific article, and the second side-edge section in the second retreat position is on the second side in the width direction relative to the second side face of the specific article as viewed in the transfer direction while the second opposing face is in contact with the second side face of the specific article.

According to this configuration, the first hook and the second hook in the retreat position can appropriately avoid interfering with the specific article having an upper section whose dimension in the width direction is larger than the dimension of a lower section in the width direction, even while the first opposing face and the second opposing face are in contact with this specific article.

It is preferable that first advance-retreat section has a first body including a first opposing face opposing a first side face of the article that faces the first side in the width direction, and a first advance-retreat mechanism configured to move the first body back and forth, the second advance-retreat section has a second body including a second opposing face opposing a second side face of the article that faces the second side in the width direction, and a second advance-retreat mechanism configured to move the second body back and forth, the first hook includes a section below an upper end of the first body, the section being so disposed, in the first retreat position, as not to interfere with the first advance-retreat mechanism relatively moving back and forth in the transfer direction with respect to the first body, and the second hook includes a section below an upper end of the second body, the section being so disposed, in the second retreat position, as not to interfere with the second advance-retreat mechanism relatively moving back and forth in the transfer direction with respect to the second body.

According to this configuration, the first hook in the first retreat position can avoid interfering with the first advance-retreat mechanism while the first body of the first advance-retreat section is moving back and forth. Similarly, the second hook in the second retreat position can avoid interfering with the second advance-retreat mechanism while the second body of the second advance-retreat section is moving back and forth. Accordingly, the first advance-retreat section and the second advance-retreat section can appropriately move back and forth.

It is preferable that the transfer device further includes: a first stopper configured to come into contact with the first hook in the first retreat position from the first side in the width direction, and a second stopper configured to come into contact with the second hook in the second retreat position from the second side in the width direction.

According to this configuration, the first hook and the second hook in the retreat position can be restrained from moving further outward in the width direction.

It is preferable that the first advance-retreat section has a first body including a first opposing face opposing a first side face of the article that faces the first side in the width direction, the second advance-retreat section has a second body including a second opposing face opposing a second side face of the article that faces the second side in the width direction, the first body includes an upper section to which a first extension member is attached, the first extension member has a third opposing face extending parallel with the first opposing face and upward from the first opposing face at a position corresponding to the first opposing face in the width direction, the second body includes an upper section to which a second extension member is attached, and the second extension member has a fourth opposing face extending parallel with the second opposing face and upward from the second opposing face at a position corresponding to the second opposing face in the width direction.

According to this configuration, even in the case of, for example, transferring an article having protruding sections protruding outward in the width direction relative to sections below the protruding sections in areas immediately above the upper-end sections of the first opposing face and the second opposing face, it is possible to prevent a region of the first hook in the retreat position that is immediately above the first opposing face and a region of the second hook in the retreat position that is immediately above the second opposing face from interfering with the protruding sections of the article.

INDUSTRIAL APPLICABILITY

The technology according to the present disclosure can be used in transfer devices.

What is claimed is:

1. A transfer device configured to perform a transfer operation to move an article in a transfer direction between a supporter configured to support the article and a transfer target location, the transfer device comprising:
a first advance-retreat section configured to move back and forth in the transfer direction relative to the supporter;
a second advance-retreat section located on a second side in a width direction, which is orthogonal to the transfer direction as viewed in an up-down direction, relative to the first advance-retreat section and configured to move back and forth in the transfer direction relative to the supporter, the second side in the width direction is one side in the width direction;
a first hook supported by the first advance-retreat section and configured to change in position between a first retreat position and a first protruding position by pivoting about a first axis parallel with the transfer direction; and
a second hook supported by the second advance-retreat section and configured to change in position between a second retreat position and a second protruding position by pivoting about a second axis parallel with the transfer direction,
wherein:
the first advance-retreat section comprises a first opposing face opposing a first side face of the article that faces the first side in the width direction,
the second advance-retreat section has a second opposing face opposing a second side face of the article that faces the second side in the width direction,
the first retreat position is a position in which the first hook is parallel with the up-down direction, a leading-end section, which is a leading-end section of the first hook, is above the first axis, and the first hook does not overlap the article as viewed in the transfer direction,
the first protruding position is a position in which the first leading-end section is on the second side in the width direction relative to a position of the first leading-end section in the first retreat position, and the first hook overlaps the article as viewed in the transfer direction,
the second retreat position is a position in which the second hook is parallel with the up-down direction, a second leading-end section, which is a leading-end section of the second hook, is above the second axis, and the second hook does not overlap the article as viewed in the transfer direction,
the second protruding position is a position in which the second leading-end section is on a first side in the width direction relative to a position of the second leading-end section in the second retreat position, and the second hook overlaps the article as viewed in the transfer direction, the first side in the width direction is another side in the width direction, the first hook has a first side-edge section that is an end edge on the second side in the width direction in the first retreat position, and the first side-edge section includes a partial region comprising at least the first leading-end section and having a shape that is, in the first retreat position, curved or bent to gradually extend toward the first side in the width direction while extending toward the first leading-end section, the second hook has a second side-edge section that is an end edge on the first side in the width direction in the second retreat position, and the second side-edge section includes a partial region comprising at least the second leading-end section and having a shape that is, in the second retreat position, curved or bent to gradually extend toward the second side in the width direction while extending toward the second leading-end section, the first side edge section has, in the first retreat position, a first base-side region that is a region on the first axis side relative to an upper-end section of the first opposing face, and a first leading-end-side region that is a region on the first leading-end section side relative to the upper-end section of the first opposing face, the first side-edge section has a curved or bent shape according to which, in the first retreat position, (i) the first base-side region has a linear shape parallel with the first opposing face, and (ii) the first leading-end-side region is formed continuously from the first base-side region and arranged close to the first side in the width direction with respect to the first base-side region such that the whole first side-edge section gradually extends toward the first side in the width direction while extending toward the first leading-end section, the second side edge section has, in the second retreat position, a second base-side region that is a region on the second axis side relative to an upper-end section of the second opposing face, and a second leading-end-side region that is a region on the second leading-end section side relative to the upper-end section of the second opposing face, and the second side-edge section has a curved or bent shape according to which, in the second retreat position, (i) the second base-side region has a linear shape parallel with the second opposing face, and (ii) the second leading-end-side region is formed continuously from the second base-side region and arranged close to the second side in the width direction with respect to the second base-side region such that the whole second side-edge section gradually extends toward the second side in the width direction while extending toward the second leading-end section.

2. The transfer device according to claim 1, further comprising:

a spacing change mechanism configured to change a spacing between the first advance-retreat section and the second advance-retreat section in the width direction, wherein:

the first advance-retreat section has a first opposing face opposing a first side face of the article that faces the first side in the width direction, the second advance-retreat section has a second opposing face opposing a second side face of the article that faces the second side in the width direction, the article whose first side face protrudes toward the first side in the width direction above an upper-end section of the first opposing face and whose second face protrudes toward the second side in the width direction above an upper-end section of the second opposing face is a specific article, the first side-edge section in the first retreat position is on the first side in the width direction relative to the first side face of the specific article as viewed in the transfer direction while the first opposing face is in contact with the first side face of the specific article, and the second side-edge section in the second retreat position is on the second side in the width direction relative to the second side face of the specific article as viewed in the transfer direction while the second opposing face is in contact with the second side face of the specific article.

3. The transfer device according to claim 1, wherein:

the first advance-retreat section has a first body including a first opposing face opposing a first side face of the article that faces the first side in the width direction, and a first advance-retreat mechanism configured to move the first body back and forth, the second advance-retreat section has a second body including a second opposing face opposing a second side face of the article that faces the second side in the width direction, and a second advance-retreat mechanism configured to move the second body back and forth, the first hook comprises a section below an upper end of the first body, the section is so disposed, in the first retreat position, as not to interfere with the first advance-retreat mechanism relatively moving back and forth in the transfer direction with respect to the first body, and the second hook comprises a section below an upper end of the second body, the section is so disposed, in the second retreat position, as not to interfere with the second advance-retreat mechanism relatively moving back and forth in the transfer direction with respect to the second body.

4. The transfer device according to claim 1, further comprising:

a first stopper configured to come into contact with the first hook in the first retreat position from the first side in the width direction, and a second stopper configured to come into contact with the second hook in the second retreat position from the second side in the width direction.

5. The transfer device according to claim 1, wherein:

the first advance-retreat section has a first body including a first opposing face opposing a first side face of the article that faces the first side in the width direction, the second advance-retreat section has a second body including a second opposing face opposing a second side face of the article that faces the second side in the width direction, the first body comprises an upper section to which a first extension member is attached, the first extension member has a third opposing face extending parallel with the first opposing face in the transfer direction and extending upward from the first opposing face at a position corresponding to the first opposing face in the width direction, the second body comprises an upper section to which a second extension member is attached, and the second extension member has a fourth opposing face extending parallel with the second opposing face in the transfer direction and extending upward from the second opposing face at a position corresponding to the second opposing face in the width direction.

6. The transfer device according to claim 1, wherein:

the first side edge section has, in the first retreat position, a first linear section parallel with the first opposing face and a first curved section curved to gradually extend toward the first side in the width direction while extending toward the first leading-end section, the first curved section is formed continuously from the first linear section toward the first leading-end section, the second side edge section has, in the second retreat position, a second linear section parallel with the second opposing face and a second curved section curved to gradually extend toward the second side in the width direction while extending toward the second leading-end section, and the second curved section is formed continuously from the second linear section toward the second leading-end section.

7. The transfer device according to claim 6, wherein:

a curvature radius of the first leading-end section is smaller than a curvature radius of the first curved section, and a curvature radius of the second leading-end section is smaller than a curvature radius of the second curved section.

* * * * *